US009507735B2

(12) United States Patent
Grube et al.

(10) Patent No.: US 9,507,735 B2
(45) Date of Patent: Nov. 29, 2016

(54) DIGITAL CONTENT RETRIEVAL UTILIZING DISPERSED STORAGE

(71) Applicant: CLEVERSAFE, INC., Chicago, IL (US)

(72) Inventors: Gary W. Grube, Barrington Hills, IL (US); Timothy W. Markison, Mesa, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 114 days.

(21) Appl. No.: 14/318,347

(22) Filed: Jun. 27, 2014

(65) Prior Publication Data
US 2014/0317694 A1 Oct. 23, 2014

Related U.S. Application Data

(63) Continuation-in-part of application No. 12/903,212, filed on Oct. 13, 2010.

(60) Provisional application No. 61/290,632, filed on Dec. 29, 2009.

(51) Int. Cl.
*G06F 15/167* (2006.01)
*G06F 12/14* (2006.01)
(Continued)

(52) U.S. Cl.
CPC ........ *G06F 12/1458* (2013.01); *G06F 12/1408* (2013.01); *G06F 12/1416* (2013.01); *G06F 21/10* (2013.01); *H04L 9/085* (2013.01); *H04L 67/06* (2013.01); *H04L 67/1097* (2013.01);
(Continued)

(58) Field of Classification Search
CPC ........... G06F 12/1408; G06F 12/1458; G06F 12/1416; G04N 21/232; G04N 21/23116
USPC .................................................. 709/213–214
See application file for complete search history.

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Chris Parry
*Assistant Examiner* — Weiwei Stiltner
(74) *Attorney, Agent, or Firm* — Garlick & Markison; Timothy W. Markison

(57) ABSTRACT

A method begins by a DS processing module, when operable within a computing device, causing the computing device to receive a request for retrieval of a set of encoded content data slices from a dispersed storage network (DSN) memory, wherein the request includes at least the identity of the set of encoded content data slices. The method continues by determining user access rights based on a content timestamp. The method continues by determining the current timestamp and whether user access rights compare favorably to the content timestamp and current timestamp or can be modified to be favorable. The method continues by retrieving encoded data slices from the DSN memory and decoding the encoded data slices utilizing an error coding dispersed storage function and in accordance with the read operational parameters producing the content and sending the content and/or the encoded data slices to the requester.

13 Claims, 16 Drawing Sheets

(51) Int. Cl.
*H04L 29/08* (2006.01)
*G06F 21/10* (2013.01)
*H04N 21/218* (2011.01)
*H04N 21/231* (2011.01)
*H04N 21/232* (2011.01)
*H04L 9/08* (2006.01)
*H04L 29/06* (2006.01)

(52) U.S. Cl.
CPC ........ *H04N 21/2181* (2013.01); *H04N 21/232* (2013.01); *H04N 21/23116* (2013.01); *G06F 2212/1052* (2013.01); *G06F 2212/154* (2013.01); *G06F 2221/0784* (2013.01); *G06F 2221/2151* (2013.01); *H04L 63/102* (2013.01); *H04L 2209/30* (2013.01); *H04L 2209/34* (2013.01); *H04L 2209/603* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,060,634 | B1* | 11/2011 | Darnell ............... H04L 67/1095 709/218 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2003/0135748 | A1* | 7/2003 | Yamada ............... G06F 21/10 713/193 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0025312 | A1* | 2/2005 | Rijkaert ............... H04N 5/913 380/37 |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0218650 | A1* | 9/2006 | Costa-Requena ....... G06F 21/10 726/27 |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0239169 | A1* | 10/2008 | Moon ............... H04N 5/44543 348/739 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0094966 | A1* | 4/2010 | Zuckerman ........ H04L 67/1002 709/219 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

(56) References Cited

OTHER PUBLICATIONS

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner

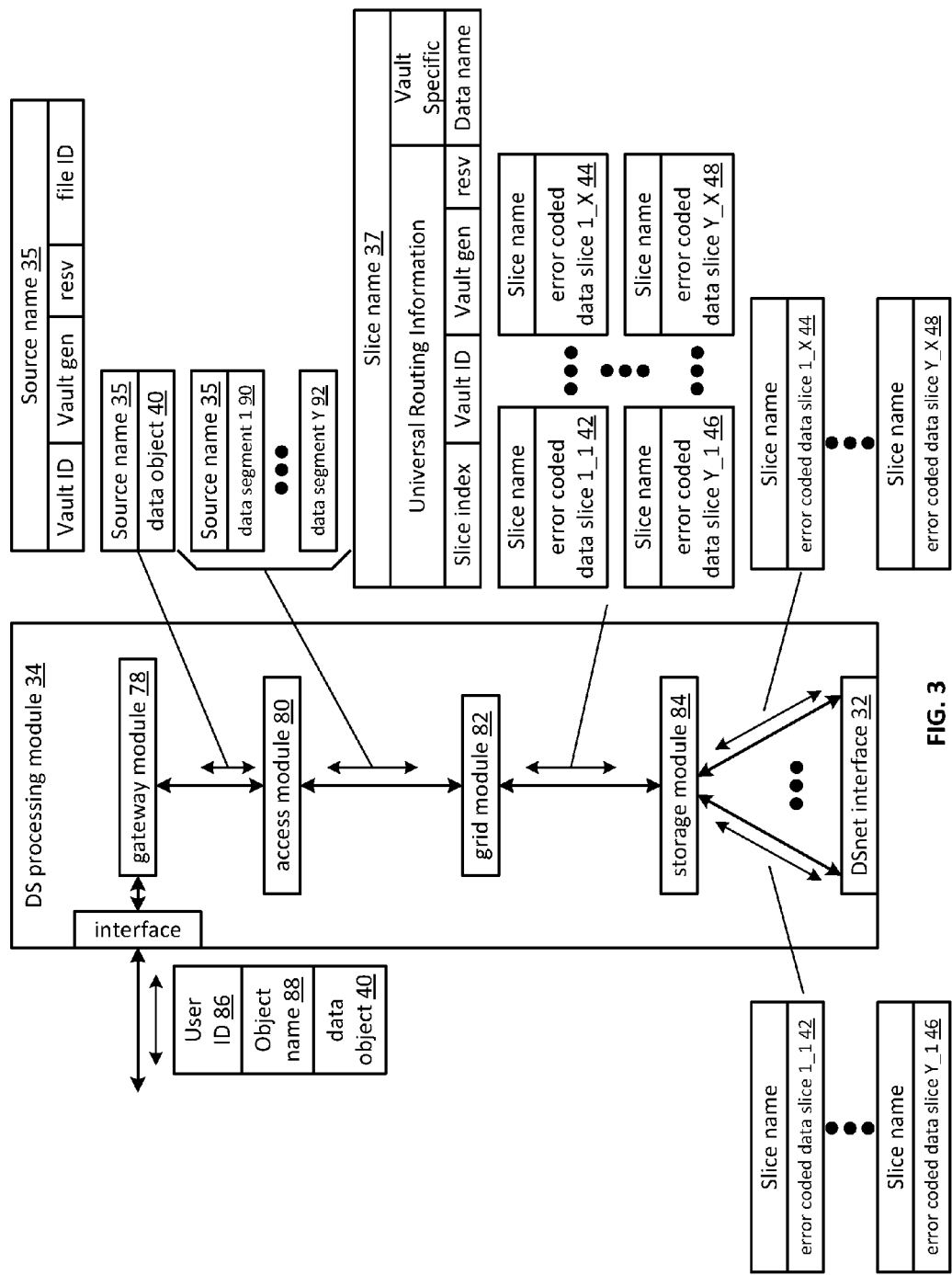

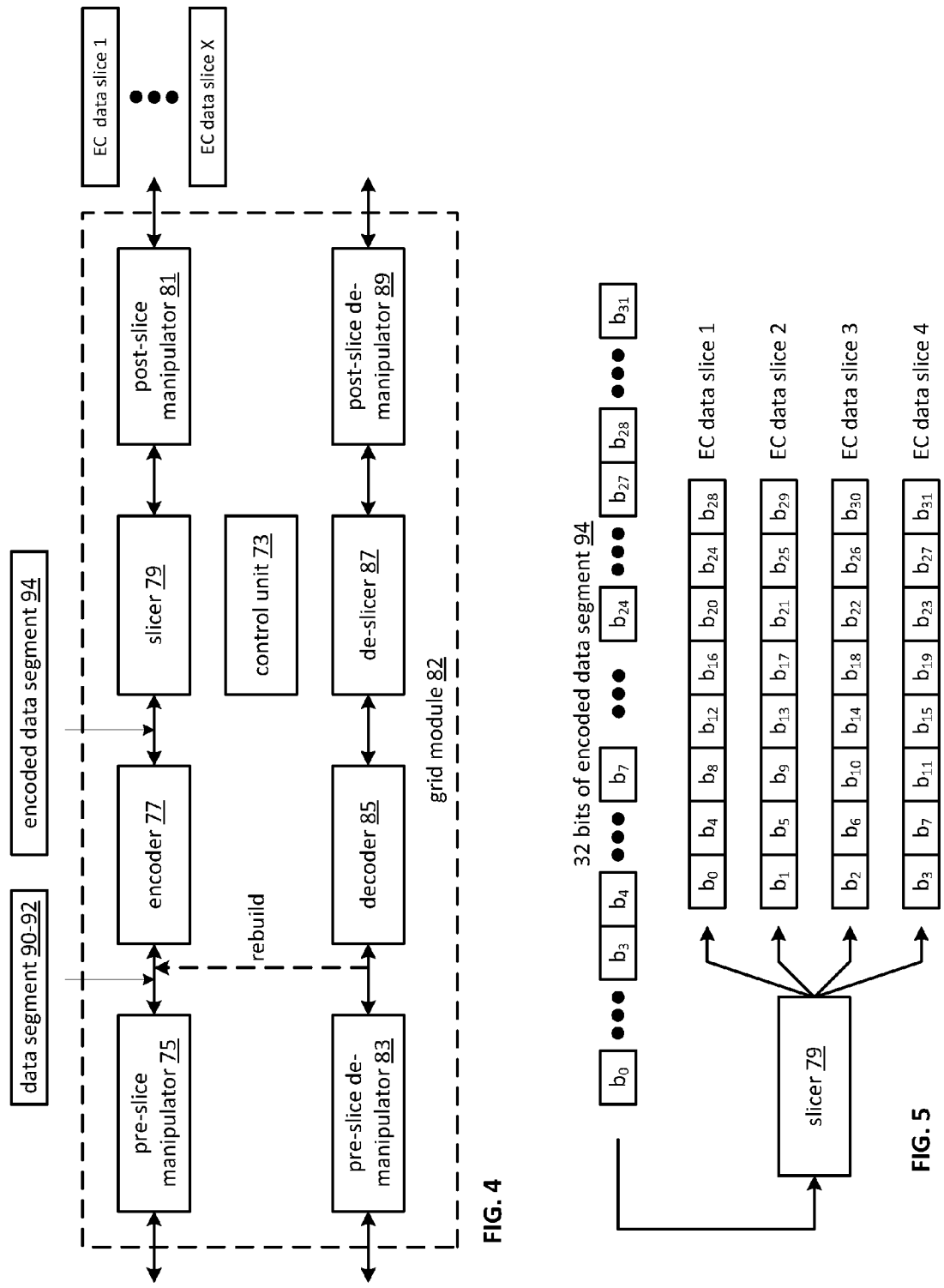

| user access rights table 146 | | | |
|---|---|---|---|
| user ID 148 | content ID 150 | start timestamp 152 | end timestamp 154 |
| 1 | A1 | 2001/10/1/5pm | 2002/7/28/6pm |
| 1 | A2 | 2009/11/18/1pm | open |
| 2 | A1 | 2000/9/3/1pm | 2001/3/9/8pm |
| 2 | B2 | 2003/2/4/7am | open |

| content ingestion table 140 | |
|---|---|
| content ID 142 | content timestamp 144 |
| A1 | 2001/12/25/3pm |
| A2 | 2009/10/5/4pm |
| B1 | 2002/9/3/1pm |
| B2 | 2004/8/16/6am |

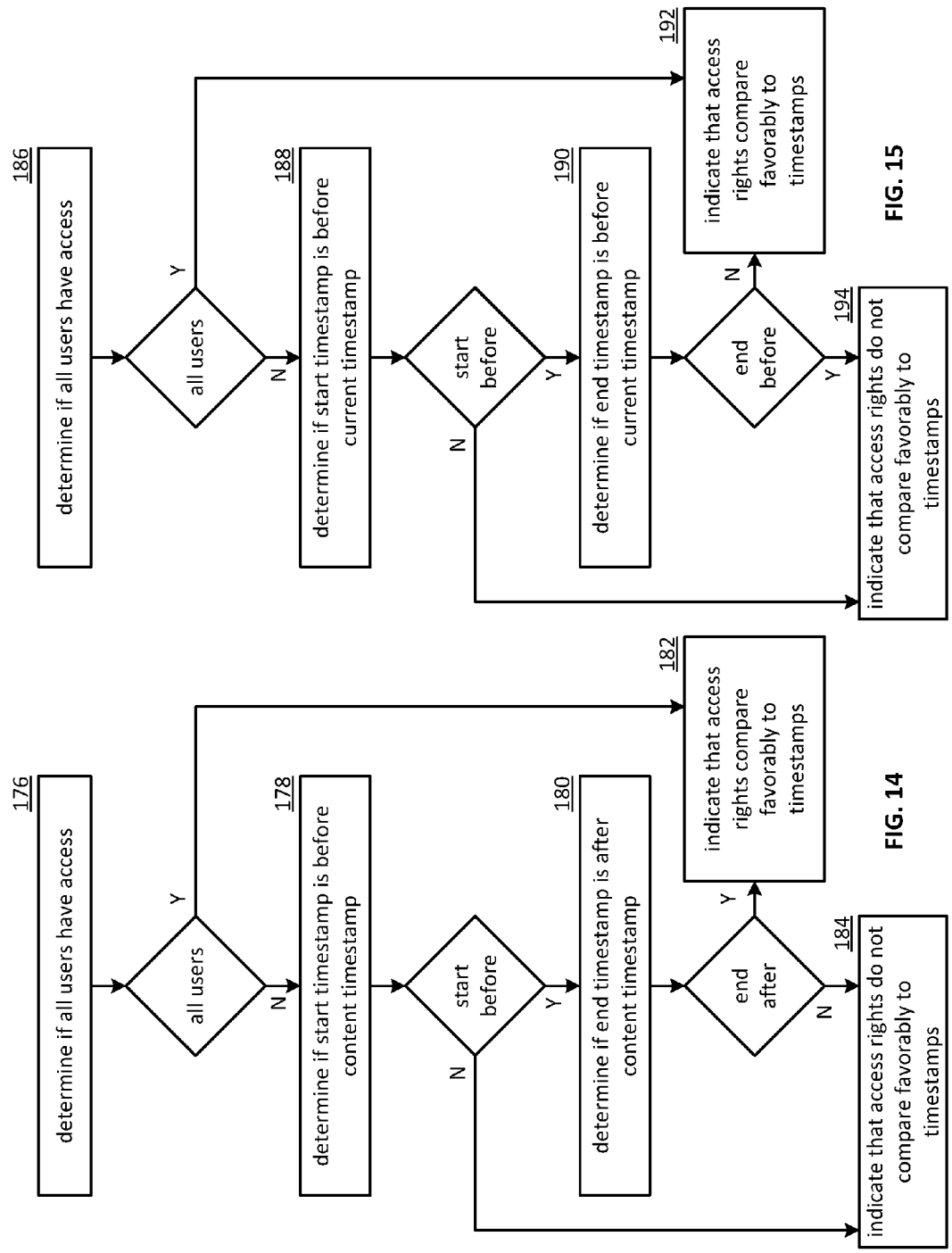

DIGITAL CONTENT RETRIEVAL UTILIZING DISPERSED STORAGE

CROSS REFERENCE TO RELATED PATENTS

The present U.S. Utility patent application claims priority pursuant to 35 U.S.C. §120 as a continuation-in-part of U.S. Utility application Ser. No. 12/903,212, entitled "Digital Content Retrieval Utilizing Dispersed Storage," filed Oct. 13, 2010, which claims priority pursuant to 35 U.S.C. §119(e) to U.S. Provisional Application No. 61/290,632, entitled "Digital Content Distributed Storage," filed Dec. 29, 2009, both of which are hereby incorporated herein by reference in their entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 3 is a schematic block diagram of an embodiment of a distributed storage processing unit in accordance with the invention;

FIG. 4 is a schematic block diagram of an embodiment of a grid module in accordance with the invention;

FIG. 5 is a diagram of an example embodiment of error coded data slice creation in accordance with the invention;

FIG. 11 is an illustration of an example content ingestion table in accordance with the invention;

FIG. 12 is an illustration of an example user access rights table in accordance with the invention;

FIG. 14 is a flowchart illustrating an example of determining user access rights in accordance with the invention;

FIG. 15 is another flowchart illustrating another example of determining user access rights in accordance with the invention;

DETAILED DESCRIPTION OF THE INVENTION

Figure 1:
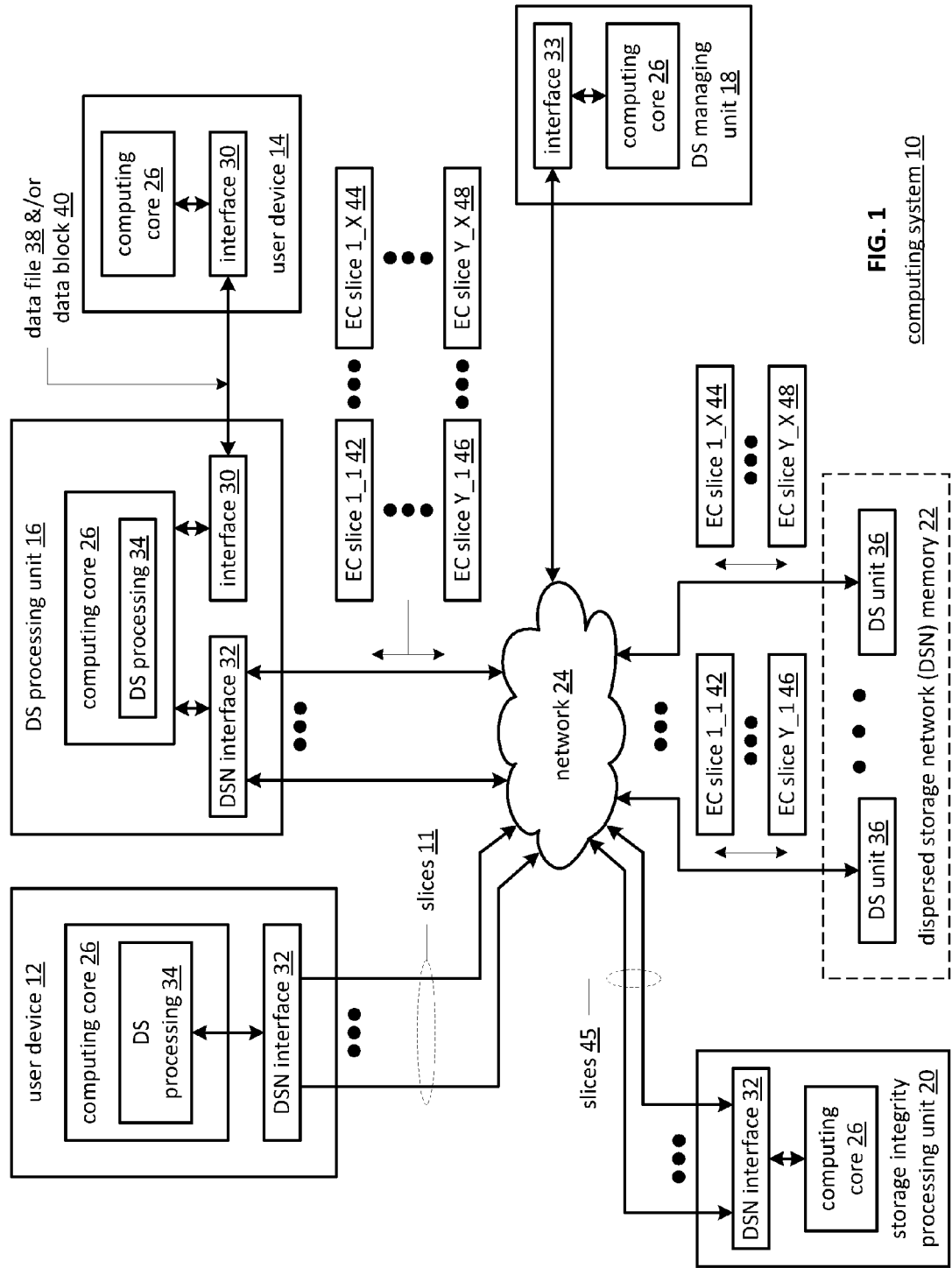
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-19.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-19.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
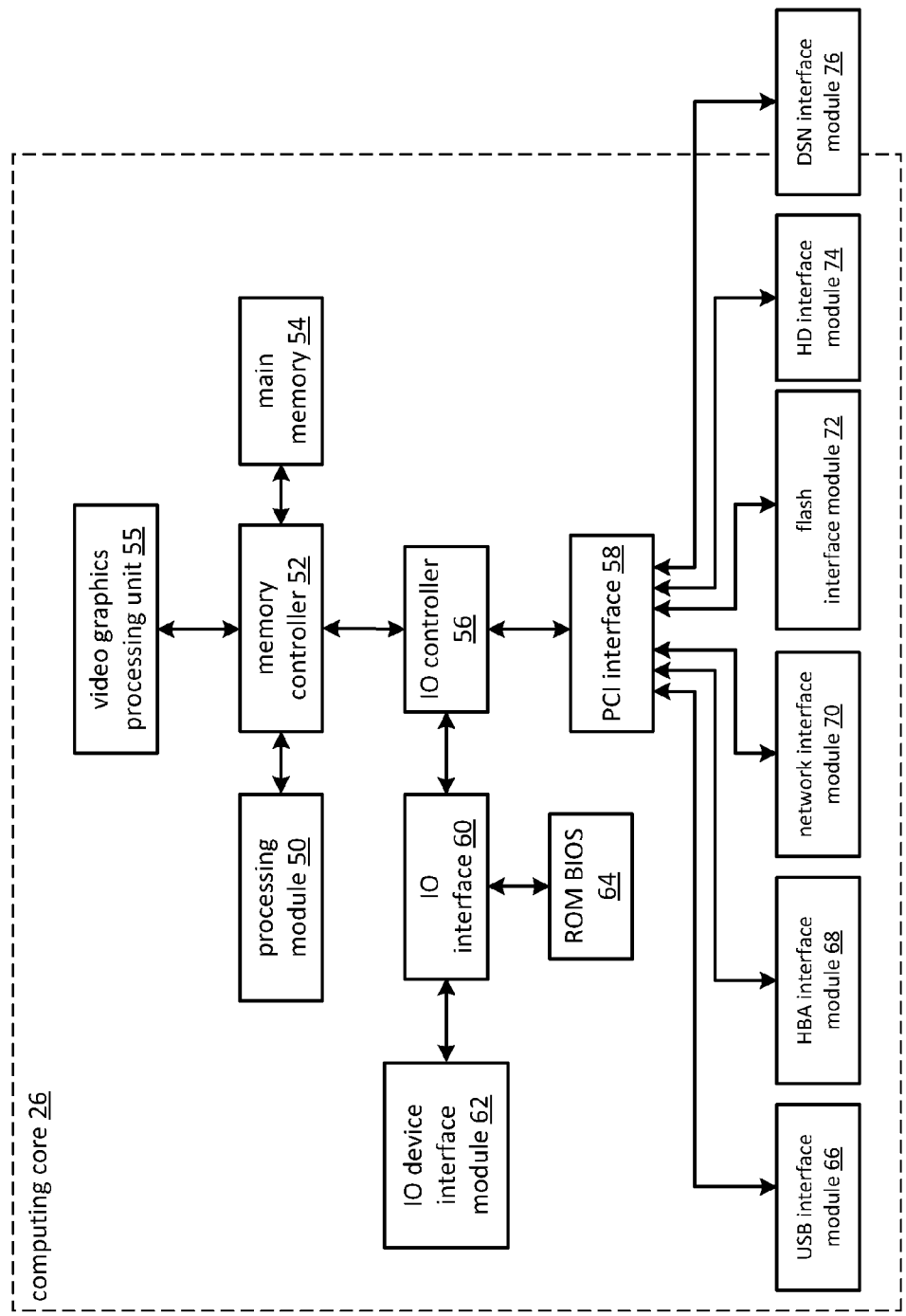
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-19.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
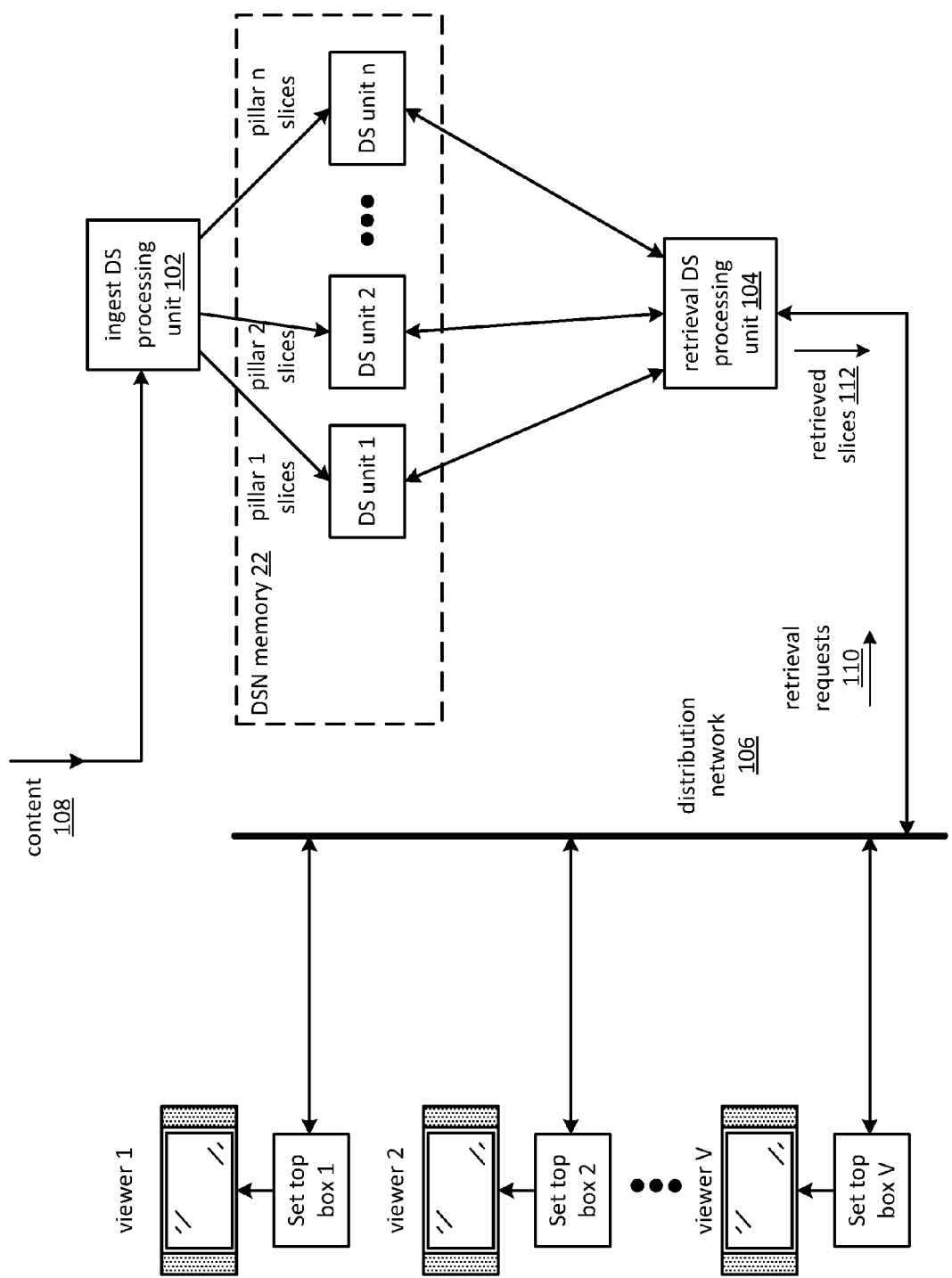
FIG. 6 is another schematic block diagram of another embodiment of a computing system in accordance with the invention.

FIG. 6 is another schematic block diagram of another embodiment of a computing system. As illustrated, the system includes at least one ingest dispersed storage (DS) processing unit 102, a dispersed storage network (DSN) memory 22, a retrieval DS processing unit 104, a distribution network 106, a plurality of set top boxes 1-V, and a plurality of viewers 1-V. The DSN memory 22 includes a plurality of dispersed storage (DS) units 1-n as previously discussed. Alternatively, the DSN memory 22 is implemented in one or more of the set top boxes 1-V. The ingest DS processing unit 102 and the retrieval DS processing unit 104 functions include those discussed previously with reference to the DS processing unit 16 (e.g., of FIGS. 1-5) and additional functionality as discussed with reference to one or more of FIGS. 6-19. Alternatively, the ingest DS processing unit 102 and the retrieval DS processing unit 104 are implemented in the same DS unit 16. Alternatively, the ingest DS processing unit 102 and the retrieval DS processing unit 104 are implemented in at least one of set top boxes 1-V. Note that the ingest DS processing unit 102 may be operably coupled to the retrieval DS processing unit 104 to facilitate exchanges including commands and content. The distribution network 106 may be implemented utilizing one or more of a hybrid fiber coax system, a satellite system, an internet access system, and a wireless system.

The set top boxes 1-V include the computing core 26 of FIG. 2 and DS processing 34. The set top boxes 1-V reproduce broadcast data in a format compatible with the viewers 1-V. The viewers 1-V may include a display and speakers such as a flat panel television to reproduce broadcast data. As illustrated, the plurality of set top boxes 1-V is operably coupled via the distribution network 106 to the retrieval DS processing unit 104. Alternatively, or in addition to, the set top boxes 1-V are operably coupled directly to the DS units 1-n and/or directly to the ingest DS processing unit 102. Alternatively, the functions of the set top boxes 1-V and viewer 1-V are integrated together. In an example, viewer 3 (e.g., including set top box 3 functionality) may be operably coupled to the retrieval DS processing unit 104 and to the DSN memory 22.

In an example of operation, the ingest DS processing 102 receives content 108 (e.g., broadcast data, cable television programming, internet media feeds, broadcast satellite feeds, etc.). Note that broadcast data may include one or more portions (e.g., TV programs) of content 108. A method of operation of a processing module (e.g., of the ingest DS processing 102) begins with the step where the processing module determines whether to error encode broadcast data. Such a determination may be based on at least one of detecting new broadcast data content (e.g., not already stored in the DSN memory 22), a predetermined schedule (e.g. a recording schedule based on inputs from at least one set top box or from a system operator schedule), a broadcast data request message (e.g., from at least one set top box). For example, the processing module determines to error encode the broadcast data when the process module determines that the broadcast data is not already being stored in the DSN memory 22. In another example, the processing module determines to error encode the broadcast data when at least one set top box has previously requested the broadcast data. The processing module ignores the broadcast data when the processing module determines not to error encode the broadcast data. The method continues to the next step when the processing module determines to error encode the broadcast data.

In the next step, the processing module encodes a portion of the broadcast data using an error coding dispersal storage function to produce a set of encoded broadcast data slices. Next, the processing module determines whether to compress the set of encoded broadcast data slices. Such a determination may be based on one or more of a minimum required slice pillar indicator, a slicing pillar width, a reliability requirement, an availability requirement, a distribution network reliability indicator, a message, a look up, and a command. In an example, the processing module determines to compress the set of encoded broadcast data slices when the process module determines that the minimum required slice pillar indicator is less than the slicing pillar width. Note that the minimum required slice pillar indicator represents particular slice pillars that are required or preferred to subsequently decode the encoded broadcast data slices to reproduce the broadcast data. For instance, the minimum required slice pillar indicator lists pillars 1-12 when the pillar width is 16. As such, pillars 13-16 are not mandated and may not be included in a subsequent subset selection of slice pillars. The method branches to the step where the processing module selects a subset of encoded broadcast data slices when the processing module determines to compress the set of encoded broadcast data slices. The method continues to the next step when the processing module determines not to compress the set of encoded broadcast data slices. In the next step, during a live broadcast of the broadcast data, the processing module sends the set of encoded broadcast data slices (e.g., as broadcast slices to set top boxes 1-V when the ingest DS processing unit 102 is operably coupled to the set top boxes 1-V) when the set of encoded broadcast data slices was not compressed.

The processing module selects a subset of encoded broadcast data slices of the set of encoded broadcast data slices when the set of encoded broadcast data slices is to be compressed. Such a selection may be based on one or more of the minimum required slice pillar indicator, the slicing pillar width, a reliability requirement, an availability requirement, the distribution network reliability indicator, a message, a look up, and a command. In example, the processing module selects pillars 1-12 as the subset of encoded broadcast data slices when the minimum required slice pillar indicator lists pillars 1-12. Next, during a live broadcast of the broadcast data, the processing module sends the subset of encoded broadcast data slices (e.g., as broadcast slices to set top boxes 1-V when the ingest DS processing unit 102 is operably coupled to the set top boxes 1-V) when the set of encoded broadcast data slices was compressed.

The example of operation continues with the step where the processing module sends the set of encoded broadcast data slices (e.g. as illustrated: pillar 1 slices, pillar 2 slices, through pillar n slices) to the DSN memory 22 for storage therein. Alternatively, the processing module sends the set of encoded broadcast data slices to the DSN memory 22 in response to receiving at least one retrieval request 110 from at least one of the set top boxes 1-V.

Note that the set top boxes 1-V may receive live broadcast slices from the ingest DS processing unit 102 when the set top boxes 1-V are operably coupled to the ingest DS processing unit 102. Alternatively, or in addition to, the set top boxes 1-V send retrieval requests 110 to the DSN memory 22 or to the retrieval DS processing unit 104 and receive retrieved slices 112 in response thus facilitating a playback of broadcast data. In an example of operation, during a playback of the broadcast data by set top box 4, the processing module receives a retrieval request 110 from a playback device (e.g., set top box 4). Next, the processing module determines a retrieval pattern for the playback device (e.g., assigned slice pillars). Such a determination may be based on one or more of receiving the retrieval pattern from the set top box 4, generating a new retrieval pattern that is unique as compared to all previously generated retrieval patterns, and a look up based on a set top box identifier. In an example, the processing module determines the retrieval pattern for set top box 4 to include pillars 2-7, 9, 13, 15, and 16 when the pillar slicing width is 16, the read threshold is 10, and the retrieval pattern has not been assigned to any other set top boxes. Next, the processing module retrieves a unique subset of the set of encoded broadcast data slices based on the retrieval pattern (e.g., retrieval of slices for pillars 2-7, 9, 13, 15, and 16). Next, the processing module sends the unique subset of the set of encoded broadcast data slices to the playback device (e.g., set top box 4).

In another example of operation, the ingest DS processing 102 receives content 108. A method of operation of a processing module (e.g., of the ingest DS processing 102) begins with the step where the processing module encodes, when enabled, (e.g., when not already stored in the DSN memory 22, when scheduled, or when requested as discussed previously) broadcast data using an error coding dispersal storage function to produce a plurality of sets of encoded broadcast data slices. The processing module stores the plurality of sets of encoded broadcast data slices in the DSN memory 22. Next, the processing module receives a playback request (e.g., a retrieval request 110) regarding the broadcast data from a playback device (e.g., a set top box). The processing module obtains a unique retrieval matrix for the playback device. The unique retrieval matrix includes one or more of a pillars list, a segmenting protocol, a pre-slice data manipulation function, a forward error correction encoding function, a slicing pillar width, a post-slice data manipulation function, a write threshold, and a read threshold. Note that the pillars list includes slice pillar identities of a number of pillars, wherein the number is between, and including a slicing pillar width number and a read threshold number.

The processing module may obtain the unique retrieval matrix by at least one of retrieving the unique retrieval matrix from the DSN memory based on an identity of the playback device and generating the unique retrieval matrix. Note that generating the unique retrieval matrix may be based on one or more of the identity of the playback device, the error coding dispersal storage function, a data identifier, a unique retrieval matrix associated with another playback device, a unique retrieval matrix functionality indicator (e.g. a mathematical manipulation function) a command, a number of playback requests received for the broadcast data, which combinations of pillars have already been assigned, a system performance indicator, a cost indicator, a subscription level indicator, a reliability requirement, a reliability estimator, a memory utilization indicator, a pillar availability indicator, a policy indicator, a total population of set top boxes indicator, and a predetermination. For example, set top box 1 may be assigned a unique retrieval matrix to read from pillars 1-10 and set top box 2 may be assigned another unique retrieval matrix to read from pillars 3-12 when the system has 16 pillars and a read threshold of 10 and both set top boxes have requested the same broadcast data. Alternatively, or in addition to, each set top box is assigned more than one set of combinations of allowed read pillars to improve read reliability.

Next, the processing module retrieves the plurality of sets of encoded broadcast data slices from the DSN memory 22 in accordance with the unique retrieval matrix to produce a plurality of unique sets of encoded broadcast data. The processing module sends the plurality of unique sets of encoded broadcast data to the playback device as retrieved slices 112. The operation of the set top boxes 1-V with respect to retrieving slices from the DSN memory 22 or receiving broadcast slices directly from the ingest DS processing unit 102 is discussed in greater detail with reference to FIG. 10.

Figure 7:
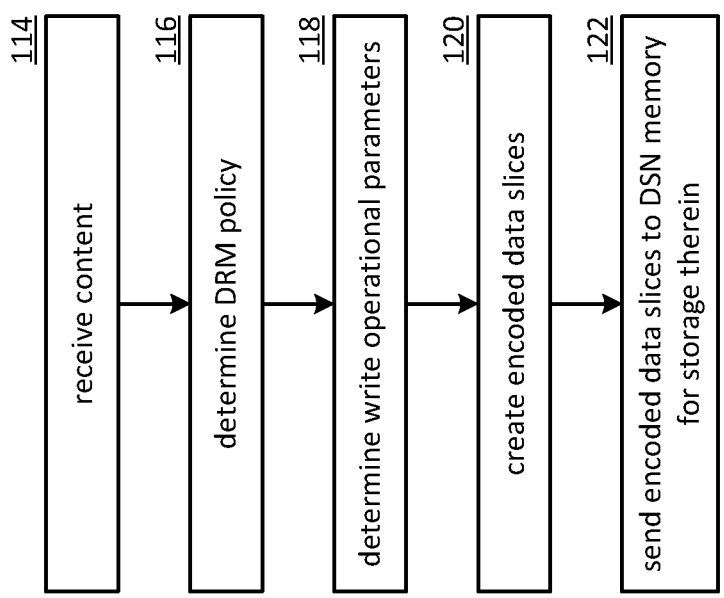
FIG. 7 is a flowchart illustrating an example of storing content in accordance with the invention.

FIG. 7 is a flowchart illustrating an example of storing content. The method begins with step 114 where a processing module (e.g., of and ingest DS processing unit) receives content from one or more of a cable television (TV) system head end, a satellite system head end, a content provider, a user device, and a media server. The content may include one or more of music, video, text, digital rights management (DRM) information, a content type indicator, a content identifier (ID), and a content size indicator. The DRM information may include one or more of a restriction indicator, a copyright indicator, an open access indicator, and access rights requirements. In an example, the copyright indicator may indicate that the content portion is copyrighted and the access rights requirements may indicate access rights that are required to utilize the copyrighted content portion.

The method continues at step 116 where the processing module determines a DRM policy where the DRM policy may indicate if a content portion is open to all set top boxes and viewers utilizing similar read operational parameters (e.g., the same read pillar combinations) or if the content portion is restricted requiring each set top box to utilize unique read operational parameters including the read pillar combinations. Such a determination may be based on one or more of DRM information, the content type indicator, the content ID, user base information, system parameters, content provider information, a command, a vault lookup, a predetermination, and a content size indicator. In an example, the processing module determines the DRM policy to be open access when the DRM information indicates that the content portion is not copyrighted. In another example, the processing module determines the DRM policy to be restricted access when the DRM information indicates that the content portion is copyrighted and/or included in a list from a content provider.

The method continues at step 118 where the processing module determines write operational parameters which may include one or more of pillar width, dispersed storage (DS) unit identifiers of DS units within a dispersed storage network (DSN) memory, a write threshold, a read threshold, encoding method, slicing method, encryption method, and an encryption key. For instance, the write operational parameters are shared in common with all of the set top boxes utilizing this storage set. Such a determination may be based on one or more of the DRM policy, the DRM information, the content type indicator, the content ID, user base information, system parameters, content provider information, a command, a vault lookup, a predetermination, and a content size indicator. In an example, the processing module determines the write operational parameters to include a pillar width n=32, a write threshold of 30, and a read threshold of 24. Note that in this example there are over 10 million read pillar combinations (e.g., ways to choose 24 read pillars from 32 pillars).

The method continues at step 120 where the processing module encodes the content utilizing an error coding dispersal storage function and in accordance with the write operational parameters to produce a plurality of sets of encoded data slices. For instance, the processing module appends the DRM policy to the content in accordance with the write operational parameters and/or DRM policy prior to the encoding of the content. In another instance, the processing module stores the DRM policy in a local memory. The method continues at step 122 where the processing module sends the encoded data slices to the DSN memory for storage therein.

Figure 8:
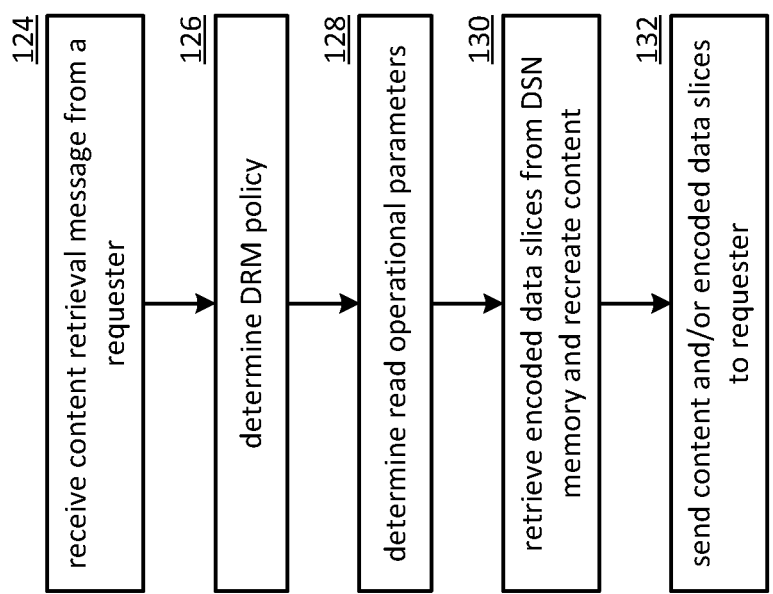
FIG. 8 is a flowchart illustrating an example of retrieving content in accordance with the invention.

FIG. 8 is a flowchart illustrating an example of retrieving content. The method begins with step 124 where a processing module (e.g., of the retrieval dispersed storage (DS) processing unit) receives a content retrieval message from a requester (e.g., a set top box, a user device, a storage integrity processing unit, a DS managing unit, another DS processing unit, a dispersed storage (DS) unit). The retrieval message may include a content ID, a user ID, digital rights management (DRM) information, a DRM policy, a content type indicator, content size indicator, and/or read operational parameters.

The method continues at step 126 where the processing module determines a DRM policy where the DRM policy may indicate if a content portion is open to all set top boxes and viewers utilizing similar read operational parameters (e.g., the same read pillar combinations) or if the content portion is restricted requiring each set top box to utilize unique read operational parameters including the read pillar combinations. Such a determination may be based on one or more of DRM information, the content type indicator, the content ID, user base information, system parameters, content provider information, a command, a vault lookup, a predetermination, and a content size indicator.

The method continues at step 128 where the processing module determines read operational parameters for the requester which may include one or more of pillar width, allowed DS units of a dispersed storage network (DSN) memory to retrieve slices, a write threshold, a read threshold, decoding method, de-slicing method, decryption method, and a decryption key. For instance, the read operational parameters may be shared in common with all of the set top boxes utilizing a common DS unit storage set when the DRM policy indicates open access. In another instance, the read operational parameters may be substantially unique for each top box utilizing a common DS unit storage set when the DRM policy indicates restricted access. Such a determination may be based on one or more of the DRM policy, the DRM information, the content type indicator, the content ID, user base information, system parameters, content provider information, a command, a vault lookup, a user vault lookup, a predetermination, a command, and/or a content size indicator. In an example, the processing module may determine the read operational parameters to include a pillar width n=32, a read threshold of 24, and one allowed pillar set combination of pillars 1-12, 15-20, 22-29.

The method continues at step 130 where the processing module retrieves encoded data slices from the allowed pillars of the DSN memory in accordance with the read operational parameters and/or DRM policy. Next, the processing module decodes the encoded data slices utilizing an error coding dispersal storage function and in accordance with the read operational parameters to produce a content portion. The method continues at step 132 where the processing module sends the content portion and/or the encoded data slices to the requester. The method to process a content retrieval message is discussed in greater detail with reference to FIGS. 13-15, and FIGS. 18-19.

Figure 9:
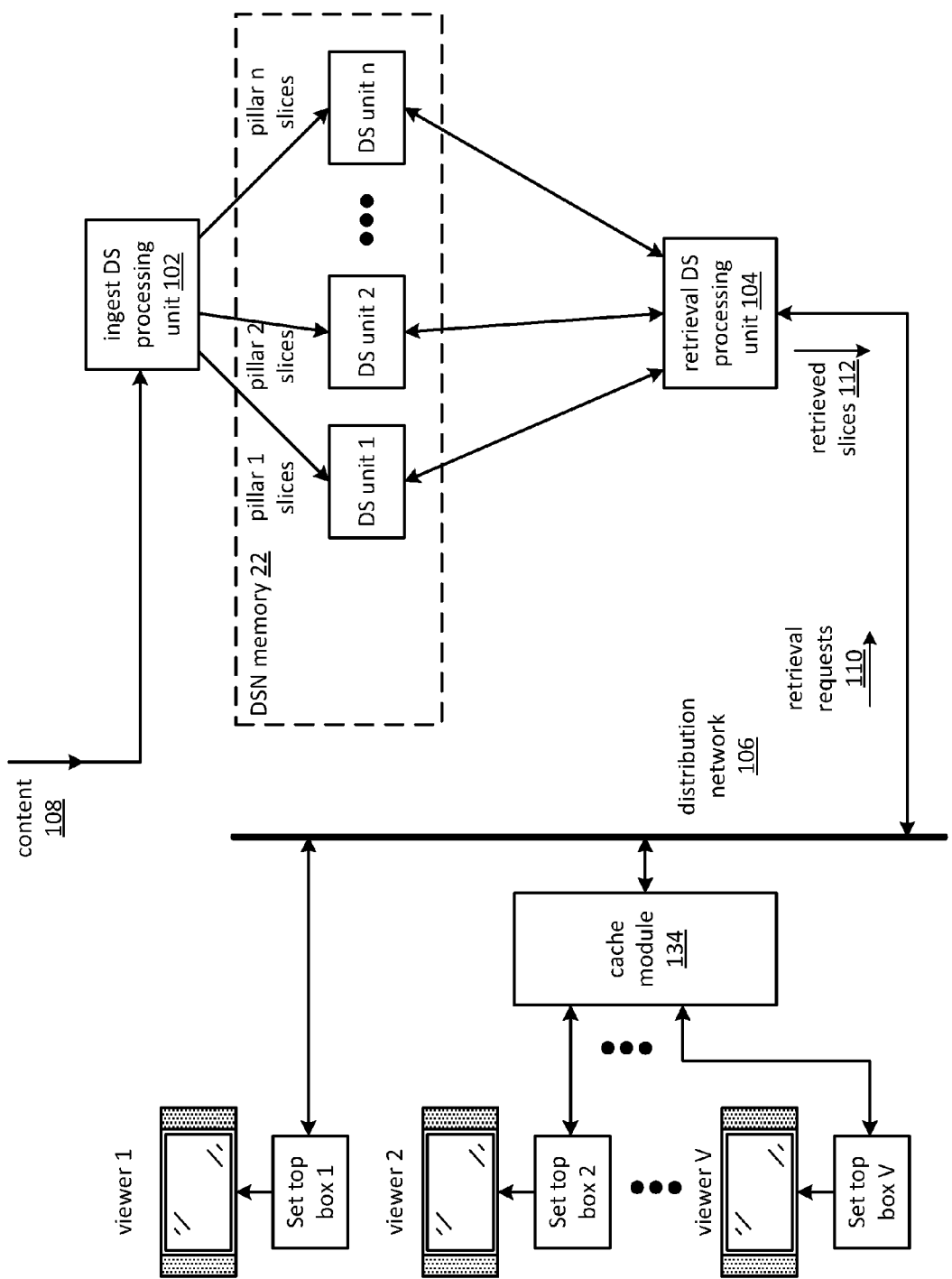
FIG. 9 is another schematic block diagram of another embodiment of a computing system in accordance with the invention.

FIG. 9 is another schematic block diagram of another embodiment of a computing system. As illustrated, the system includes at least one ingest dispersed storage (DS) processing unit 102, a dispersed storage network (DSN) memory 22, a retrieval DS processing unit 104, a distribution network 106, at least one cache module 134, a plurality of set top boxes 1-V, and a plurality of viewers 1-V. The DSN memory 22 includes a plurality of DS units 1-n. The distribution network 106 may include one or more of a hybrid fiber coax system, a satellite system, an internet access system, and a wireless system. The set top boxes 1-V include the computing core 26 of FIG. 2 DS processing 34 to receive/retrieve content slices, de-slice, and decode to produce the content for consumption (e.g., viewing). The viewers 1-V may be implemented with a flat panel television including a display and speakers to reproduce content. As illustrated, the ingest DS processing unit 102 and the retrieval DS processing unit 104 are implemented as at least two units. In another implementation example, the ingest DS processing unit 102 and the retrieval DS processing unit 104 are implemented in the same unit. In yet another implementation example, the ingest DS processing unit 102 and/or the retrieval DS processing unit 104 are implemented as part of at least one of the set top boxes 1-V. In yet another implementation example, the DSN memory 22 is implemented in one or more of the set top boxes 1-V. The cache module 134 may be implemented utilizing the computer core 26 of FIG. 2 and may further be implemented as an independent unit and/or in one or more of the set top boxes 1-V serving a plurality of set top boxes (e.g., common to a building or a neighborhood).

The ingest DS processing unit 102 stores at least a portion of content 108 in the DSN memory 22. The retrieval DS processing unit 104 retrieves at least a portion of the content 108 from the DSN memory 22 and sends the content 108 as retrieved slices 112 via the distribution network 106 to one or more of the set top boxes 1-V for consumption by one or more of the viewers 1-V. The viewers 1-V reproduce content (e.g., video, audio, pictures, web content) output from the corresponding set top boxes 1-V. The set top boxes 1-V may select live broadcast content (e.g., broadcast/multicast or on-demand video over cable, satellite and/or the internet) and/or stored content from the DSN memory 22 via the cache module 134 and/or the retrieval DS processing unit 104.

The set top boxes 1-V send retrieval request 110 messages to the retrieval DS processing unit 104, the cache module 134, and/or DSN memory 22 that include control commands. The commands may include one or more of record, playback, pause, skip forward, skip backwards, select broadcast content, and delete. For example, the ingest DS processing unit 102 may store a portion of the content 108 in the DSN memory 22 in response to a record command from set top box 6 and the retrieval DS processing unit 104 may retrieve a portion of the content from the DSN memory 22 and send it to one or more of the cache module 134, the viewer 6, and/or the set top box 6 in response to receiving a playback command from set top box 6.

The cache module 134 retrieves slices and/or content portion slice streams 112 from the retrieval DS processing unit 104 and/or the DSN memory 22, temporarily saves the slices in memory of the cache module 134, sends at least some of the slices to at least one or more set top boxes 1-V, and deletes the slices saved in the memory of the cache module 134. In an example of operation, the cache module 134 determines which slices to save in memory of the cache module 134 based on one or more of content portion requests/commands from set top boxes/viewers, monitoring of slice streams (e.g., slice streams from the DSN memory 22 to the set top boxes 1-V), a vault lookup, a system performance indicator, a distribution network performance indicator, a command, and a predetermination. In an example, the cache module 134 determines to save slice streams 112 for set top boxes 2 and 3 when set top boxes 2 and 3 are receiving substantially the same content (e.g., at least some of the same slice pillars). Note that set top boxes 2 and 3 may be viewing the same live broadcast or may be downloading the same content portion for subsequent viewing. Further note that set top boxes 2 and 3 may not be retrieving the same exact pillars from the DSN memory 22 since they may be utilizing different read operational parameters including different read pillars. In an example, cache module 134 retrieves slices of the common read pillars from the DSN memory 22 and/or the retrieval DS processing unit 104 on behalf of set top boxes 2 and 3 in one set of slice streams from the DSN memory 22 through the distribution network 106 rather than in two slice streams through the distribution network 106. Note that the method of the cache module 134 may provide an improved utilization of the available capacity of the distribution network 106, the DSN memory 22, and/or the retrieval DS processing unit 104.

In another example of operation of the cache module 134, the cache module 134 determines that set top box 2 and set top box 3 have requested the same content portion (e.g., from the playback command, monitoring slice streams in progress). The cache module 134 sends a proxy message (e.g., a retrieval request 110) to the retrieval DS processing unit 104 where the proxy message indicates that the retrieval DS processing unit 104 is requested to send one set of common pillar slices via the distribution network 106 to the cache module 134 rather than sending two sets of the same slices to the individual set top boxes 2 and 3. Next, the cache module 134 receives the common set of pillar slices (e.g., retrieve slices 112) from the retrieval DS processing unit 104 and temporarily saves the slices in the memory of the cache module 134. The cache module 134 retrieves a subset of slices associated with set top box 2 of the slices from the memory of the cache module and sends the subset of slices to set top box 2. The cache module 134 retrieves a subset of slices associated with set top box 3 of the slices from the memory of the cache module and sends the subset of slices to set top box 3. For instance, a connection from the cache module 134 to the set top boxes 2 and 3 may be provided via a common neighborhood coax subsystem that is partitioned from the primary distribution network 106.

In an example of operation, the ingest DS processing unit 102 determines which portion of the content 108 to store in the DSN memory 22 for subsequent retrieval (e.g., immediately, minutes, hours, days, and even years later) and consumption by one or more of the set top boxes 1-V. Such a determination may be based on one or more of a command, a command from the set top box, a command from the retrieval DS processing unit, a command from a DS managing unit, a DSN memory status indictor, and a predetermination. In an example, the ingest DS processing 102 determines to store all of the received content 108 based on a predetermination. For instance, the ingest DS processing unit 102 continuously stores all content 108 from a 500 channel cable TV distribution system. The set top boxes 1-V may retrieve slices and/or content immediately and/or at a time much later than the original reception of the content by the ingest DS processing unit 102. For instance, the set top boxes 1-V retrieve content from the DSN memory 22 immediately after the content 108 was stored in the DSN memory 22 to mimic broadcast reception. In another instance, the set top boxes 1-V may retrieve content from the DSN memory 22 hours, days, months, or even years after the content of 108 was stored in the DSN memory 22 to mimic digital video recorder playback.

In another example of operation, the ingest DS processing unit 102 determines to store content selected by one or more of the plurality of set top boxes 1-V. For instance, set top box 2 sends a record command to the ingest DS processing unit 102 where the record command includes a command to record the 5:30 pm evening news on cable channel 188 on October 18. The ingest DS processing unit 102 processes the record command which may include saving the store command for future execution. The ingest DS processing unit 102 executes the store command on October 18 at 5:30 pm by selecting the content from cable channel 188, receiving the content, determining write operational parameters (e.g., pillar width n, write threshold, encoding method, slicing method, encryption method, etc.), encoding the content utilizing and error coded dispersed storage function and in accordance with write operational parameters to produce a plurality of sets of encoded data slices, determining which DS units to store the plurality of sets of encoded data slices, and sending the plurality of sets of encoded data slices to the DSN memory 22 with a store command for storage in the selected DS units. Note that the ingest DS processing unit 102 determines the write operational parameters based on one or more of a command, a command from the retrieval DS processing unit, an estimated number of store commands received for the same content indicator, a system performance indicator, a memory utilization indicator, a policy indicator, a total population of set top boxes indicator, and a predetermination.

Note that multiple set top boxes may send the ingest DS processing unit 102 a record command specifying the same content portion. In an example, the ingest DS processing unit 102 stores slices created from the content portion in response to receiving at least one record command for the content portion from at least one set top box. The ingest DS processing unit 102 determines if it has received record commands for the same content portion (e.g., check a table of pending record operations) and processes the record commands in accordance with the determination. In another example, the ingest DS processing unit 102 queues the store command based on receiving a first record command for the content portion and queues nothing when receiving a second record command for the same content portion as the first record command. In other words, the first record command for a given content portion invokes storing the content as slices to the DSN memory 22 and any other subsequent record commands for the same content do not change the storing of that content portion as slices in the DSN memory 22.

In another example of operation, the ingest DS processing unit 102 queues the store command based on receiving a first record command for the content portion and queues another store command when receiving a second (or subsequent) record command for the same content portion as the first record command. The ingest DS processing unit 102 may determine different write operational parameters based on receiving two or more store commands for the same content portion. Such a determination may be based on one or more of a command, a command from the retrieval DS processing unit, the number of store commands received for the same content portion, a system performance indicator, a memory utilization indicator, a policy indicator, a total population of set top boxes indicator, and a predetermination.

Note that the ingest DS processing unit 102 may receive a record/store command after the content (e.g., a live broadcast stream) has started to be received, but before it has all been received (e.g., part way in a real time broadcast). The ingest DS processing unit 102 may determine the same or different write operational parameters for a content recording in progress when an incremental record command for that content is received.

The ingest DS processing unit 102 processes the record command (e.g., from the viewer/set top box) including determining read operational parameters for the viewer for this content portion (e.g., pillar width n, which particular pillars are allowed to read, read threshold, decoding method, de-slicing method, decryption method, etc.). In an example, the ingest DS processing unit 102 performs the determination when the ingest DS processing unit 102 receives the record command. In another example, the retrieval DS processing unit 104 may make the read operational parameters determination when the retrieval DS processing unit 104 receives a playback command from a viewer/set top box. In either example, the determination may be based on one or more of a command, the number of store commands received for the same content portion, an estimated number of store commands received for the same content portion indicator, which combinations of pillars have already been assigned (e.g., the read operational parameters of other viewers), a system performance indicator, a cost indicator, a subscription level indicator, a reliability requirement, a reliability estimator, a memory utilization indicator, a pillar availability indicator, a policy indicator, a total population of set top boxes indicator, and a predetermination.

In an example, set top box 1 is assigned read operational parameters to read from pillars 1-10 and set top box 2 is assigned read operational parameters to read from pillars 3-12 when the system has 16 pillars and a read threshold of 10 and both set top boxes have requested the same content portion. In another example, each set top box is assigned more than one set of combinations of allowed read pillars to improve read reliability. For instance, the retrieval DS processing 104 may utilize one or more of the allowed read pillar sets of the read operational parameters (e.g., for the particular set top box) to convert retrieved slices from the allowed read pillars into the desired content portion. In another instance, a DS processing of the set top box may utilize one or more of the allowed read pillar sets of the read operational parameters (e.g., for the particular set top box) to convert retrieved slices 112 from the allowed read pillars into the desired content portion. The method of operation of the system to store and retrieve content is discussed in greater detail with reference to FIGS. 10-19.

Figure 10:
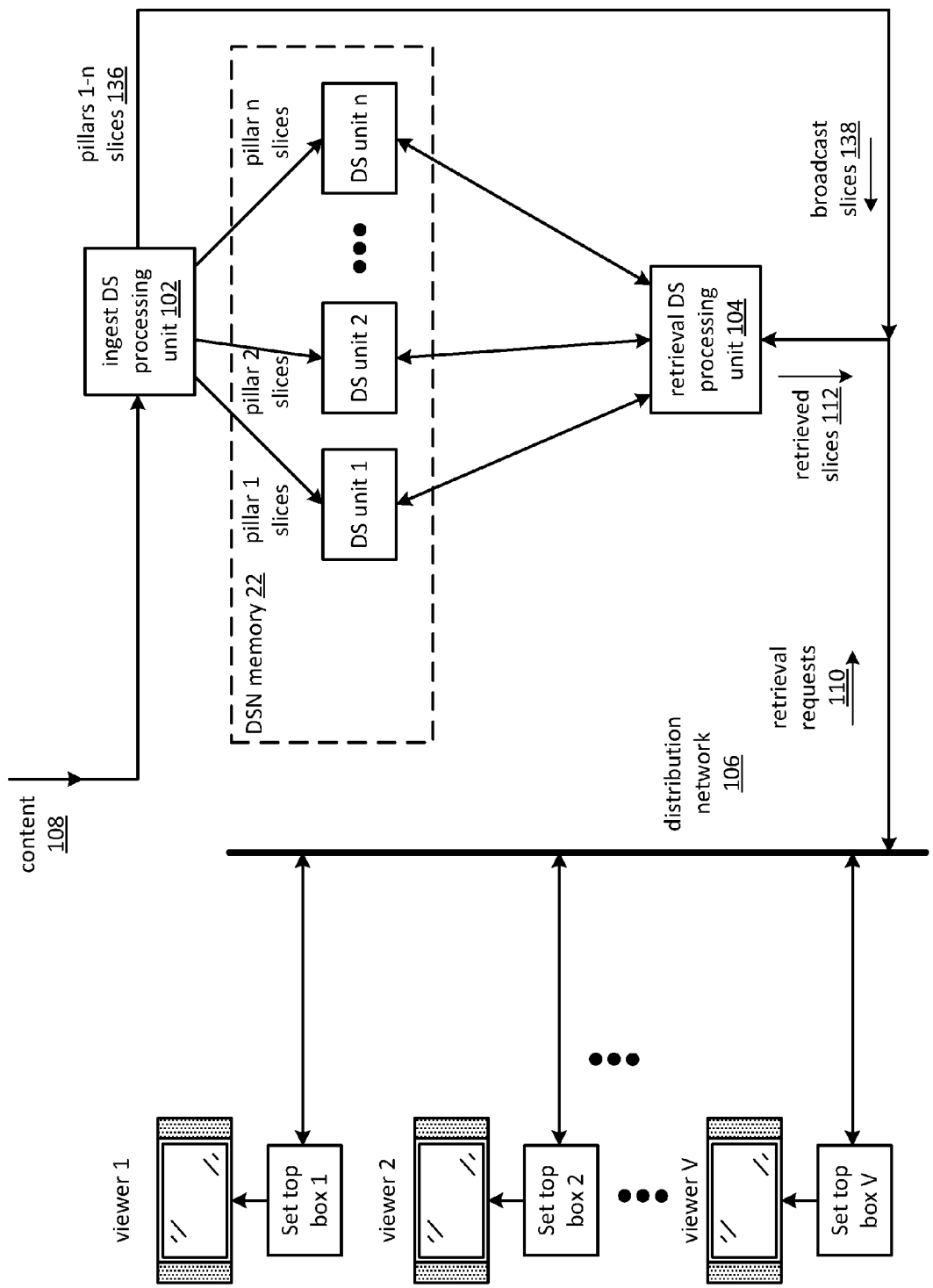
FIG. 10 is another schematic block diagram of another embodiment of a computing system in accordance with the invention.

FIG. 10 is another schematic block diagram of another embodiment of a computing system. As illustrated, the system includes at least one ingest dispersed storage (DS) processing unit 102, a dispersed storage network (DSN) memory 22, a retrieval DS processing unit 104, a distribution network 106, a plurality of set top boxes 1-V, and a plurality of viewers 1-V. The DSN memory 22 includes a plurality of dispersed storage (DS) units 1-n as previously discussed. Alternatively, the DSN memory 22 is implemented in one or more of the set top boxes 1-V. The ingest DS processing unit 102 and the retrieval DS processing unit 104 functions include those discussed previously (e.g., of FIGS. 1-9) and additional functionality as discussed with reference to FIGS. 10-26. Alternatively, the ingest DS processing unit 102 and the retrieval DS processing unit 104 are implemented in the same DS unit 16. Alternatively, the ingest DS processing unit 102 and the retrieval DS processing unit 104 are implemented in at least one of set top boxes 1-V. Note that the ingest DS processing unit 102 may be operably coupled to the retrieval DS processing unit 104 to facilitate exchanges including commands and content. The distribution network 106 may be implemented utilizing one or more of a hybrid fiber coax system, a satellite system, an internet access system, and a wireless system.

The set top boxes 1-V include the computing core 26 of FIG. 2 and a DS processing 34. The set top boxes 1-V reproduce broadcast data in a format compatible with the viewers 1-V. The viewers 1-V may include a display and speakers such as a flat panel television to reproduce broadcast data. As illustrated, the plurality of set top boxes 1-V is operably coupled via the distribution network 106 to the retrieval DS processing unit 104. As illustrated the set top boxes 1-V are operably coupled directly to the ingest DS processing unit 102. Alternatively, or in addition to, the set top boxes 1-V are operably coupled directly to the DS units 1-n. Alternatively, the functions of the set top boxes 1-V and viewer 1-V are integrated together. In an example, viewer 3 (e.g., including set top box 3 functionality) may be operably coupled to the retrieval DS processing unit 104, to the ingest DS processing unit 102, and to the DSN memory 22.

As previously discussed, the ingest DS processing 102 receives content 108 as broadcast data and a processing module encodes a portion of the broadcast data using an error coding dispersal storage function to produce a set of encoded broadcast data slices, sends the set of encoded broadcast data as pillars 1-n slices 136 to set top boxes 1-V when the set of encoded broadcast data slices was not compressed or sends a subset of encoded broadcast data slices as broadcast slices 138 to set top boxes 1-V when the set of encoded broadcast data slices was compressed. As previously discussed, the processing module sends the set of encoded broadcast data slices (e.g. as illustrated: pillar 1 slices, pillar 2 slices, through pillar n slices) to the DSN memory 22 for storage therein.

In an example of operation of a playback device (e.g., a set top box), a processing module obtains a unique retrieval matrix based on an identity of the playback device. The unique retrieval matrix includes one or more of a pillars list, a segmenting protocol, a pre-slice data manipulation function, a forward error correction encoding function, a slicing pillar width, a post-slice data manipulation function, a write threshold, and a read threshold. Note that the pillars list includes slice pillar identities of a number of pillars, wherein the number is between, and including a slicing pillar width number and a read threshold number.

The processing module may obtain the unique retrieval matrix by at least one of retrieving the unique retrieval matrix from the DSN memory 22 based on an identity of the playback device and generating the unique retrieval matrix. Note that generating the unique retrieval matrix may be based on one or more of an identity of a previously received subset of a previous set of encoded broadcast data slices, the identity of the playback device, an error coding dispersal storage function, a data identifier, a unique retrieval matrix associated with another playback device, a unique retrieval matrix functionality indicator (e.g. a mathematical manipulation function) a command, a number of playback requests received for the broadcast data, which combinations of pillars have already been assigned, a system performance indicator, a cost indicator, a subscription level indicator, a reliability requirement, a reliability estimator, a memory utilization indicator, a pillar availability indicator, a policy indicator, a total population of set top boxes indicator, and a predetermination. For example, set top box 1 may be associated with a unique retrieval matrix to read from pillars 1-10 and set top box 2 may be associated with another unique retrieval matrix to read from pillars 3-12 when the system has 16 pillars and a read threshold of 10 and both set top boxes have requested the same broadcast data. Alternatively, or in addition to, each set top box may utilize more than one set of combinations of allowed read pillars to improve read reliability.

The example of operation continues with the step where the processing module sends a request for retrieval (e.g. a retrieval request 110) of a set of encoded broadcast data slices to the DSN memory 22, wherein the request includes the unique retrieval matrix and an identity of the set of encoded broadcast data slices. Alternatively, the processing module may send the request for retrieval to the retrieval DS processing unit 104. The processing module receives a subset of the set of encoded broadcast data slices (retrieved slices 112) from the DSN memory 22 (directly or via the retrieval DS processing unit 104) via the distribution networks 106, wherein the subset of the set of encoded broadcast data slices is based on the unique retrieval matrix. Next, the processing module stores (e.g., in a slice buffer) the subset of the sets of encoded broadcast data slices. The processing module decodes the subset of the set of encoded broadcast data slices using an error coding dispersal storage function and in accordance with the unique retrieval matrix to produce a portion of broadcast data.

Note that the set top boxes 1-V may receive live broadcast slices 138 from the ingest DS processing unit 102 and switch to retrieving retrieved slices 112 from the retrieval DS processing unit when the set top box can no longer consume the live broadcast slices 138 (e.g., a pause mode) as described below. In an example of operation, the processing module of set top box 5 receives, during a live broadcast of a portion of broadcast data, the set of encoded broadcast data slices 138 (e.g., from the ingest DS processing unit 102). Next, the processing module detects a pause function of the live broadcast (e.g., a set top box 3 user input) and buffers subsequent sets of encoded broadcast data slices in a slice buffer while the pause function is active. Note that the slice buffer of set top box 3 may have a memory capacity that is substantially less than the memory capacity of the DSN memory 22. In an example, the slice buffer has a one-minute of broadcast content memory capacity.

Next, the processing module determines whether a slice buffer indicator of the slice buffer compares unfavorably with a slice buffer threshold. For instance, the slice buffer indicator indicates the magnitude of utilization of the slice buffer. In an example, the processing module determines that the comparison is unfavorable when the slice buffer indicator is greater than the slice buffer threshold (e.g., the buffer is filling up). The method branches to the step where the processing module determines whether the slice buffer indicator compares unfavorably with a second slice buffer threshold when the processing module determines that the slice buffer indicator does not compare unfavorably to the slice buffer threshold. The method continues to the next step when the processing module determines that the slice buffer indicator does compare unfavorably to the slice buffer threshold. In the next step, the processing module ceases the buffering of the subsequent set of encoded broadcast data slices 138. The processing module detects a resume function of the live broadcast (e.g., a play command user input has been received by the set top box 3). Next, the processing module retrieves the subsequent sets of encoded broadcast data slices from the slice buffer when the resume function is detected.

The example of operation continues with the step for the processing module determines whether the slice buffer indicator compares unfavorably with a second slice buffer threshold. In an example, the processing module determines that the comparison is unfavorable when the slice buffer indicator is less than the second slice buffer threshold (e.g., the buffer is emptying out). In another example, the processing module determines that the comparison is unfavorable when the slice buffer indicator is less than the second slice buffer threshold and recent broadcast slices stored within the slice buffer are older than current broadcast slices 138 being broadcast live. Note that this scenario may happen when the slice buffer is filled while on pause and live broadcast continues.

The processing module continues to receive live broadcast slices 138 when the processing module determines that a slice buffer indicator does not compare unfavorably with the second slice buffer threshold. The method continues to the next step when the when the processing module determines that slice buffer indicator compares unfavorably with the second slice buffer threshold. In the next step, the processing module sends a request for retrieval 110 of another subsequent set of encoded broadcast data slices to the DSN memory 22 and/or to the retrieval DS processing unit 104. The processing module receives a subset of the other subsequent set of encoded broadcast data slices as retrieved slices 112 from the DSN memory 22, wherein the subset of the other subsequent set of encoded broadcast data slices is based on the unique retrieval matrix. The processing module stores the subset of the other subsequent set of encoded broadcast data slices in the slice buffer. The processing module decodes the set of encoded broadcast slices using the error coding dispersal storage function to recapture the portion of the broadcast data during the live broadcast of the portion of the broadcast data.

FIG. 11 is an illustration of an example content ingestion table 140. As illustrated, the content ingestion table 140 includes a content identifier (ID) 142 field and a content timestamp 144 field. In an example of operation, an ingest DS processing unit populates the content ingestion table 140 upon ingestion of content. For instance, the ingest DS processing unit receives the content, determines the content ID, determines a current timestamp (e.g., a system clock), and stores the content ID in the content ID 142 field and stores the current timestamp as the content timestamp in the content timestamp 144 field of the content ingestion table 140. The current timestamp determination may be based on one or more of a system clock, an ingest dispersed storage (DS) processing unit clock, a command, a message, and a query. In another example of operation, the ingest DS processing unit receives content on Dec. 25, 2001 at 3 PM that includes a content portion with a content ID of A1. The ingest DS processing unit adds an entry to the content ingestion table 140 that includes the content ID of A1 in the content ID 142 field and a content timestamp of Dec. 25, 2001 at 3 PM in the content timestamp 144 field.

A retrieval DS processing unit may utilize information from the content ingestion table 140 to determine when the content was ingested into a dispersed storage network (DSN) memory. In an example, the retrieval DS processing unit may retrieve the content from the DSN memory and send it to a requester if the requester had access rights to the content at the time when the content was ingested. The method of the retrieval DS processing unit to retrieve content based in part on the access rights is discussed in greater detail with reference to FIGS. 13-15.

FIG. 12 is an illustration of an example user access rights table 146. As illustrated, the user access rights table 146 includes a user identifier (ID) 148 field, a content ID 150 field, a start timestamp 152 field, and an end timestamp 154 field. In an example of operation, a dispersed storage (DS) managing unit populates the user access rights table 146 and may be based on content subscription information. As illustrated, user ID 2 had access to content ID A1 with a start timestamp of Sep. 3, 2000 1 PM until an end timestamp of Mar. 9, 2001 at 8 PM. User ID 1 has access to content A2 from Nov. 18, 2009 at 1 PM until the present time.

In an example of operation, a retrieval DS processing unit utilizes the user access rights table 146 to determine if a requester has sufficient access rights to requested content. In an example, the retrieval DS processing unit determines if the requester had access rights when the content was ingested into a dispersed storage network (DSN) memory. For instance, the retrieval DS processing unit receives a retrieval request message for content ID A1 from a requester with a user ID 1. The retrieval DS processing unit obtains information from a content ingestion table 140 to determine that the content timestamp for content ID A1 is Dec. 25, 2001 at 3 PM. The retrieval DS processing unit obtains information from the user access rights table 146 to determine that the user ID 1 had content ID A1 access rights from Oct. 1, 2001 at 5 PM to Jul. 28, 2002 at 6 PM. The retrieval DS processing unit retrieves content ID A1 from the DSN memory and sends content ID A1 to the requester since the user ID had sufficient access rights when content A1 was ingested into the DSN memory.

In another example, the retrieval DS processing unit may determine if the user currently has access rights. For instance, the retrieval DS processing unit receives a retrieval request message for content ID A1 from a requester with a user ID 1. The retrieval DS processing unit obtains information from the content ingestion table 140 to determine that the content timestamp for content ID A1 is Dec. 25, 2001 at 3 PM. The retrieval DS processing unit obtains information from the user access rights table 146 to determine that the user ID 1 had content ID A1 access rights from Oct. 1, 2001 at 5 PM to Jul. 28, 2002 at 6 PM. The retrieval DS processing unit determines that the current timestamp is Dec. 27, 2009 at 3 PM. The retrieval DS processing unit does not retrieve content ID A1 from the DSN memory since the user ID does not currently have sufficient access rights to content A1. The method of the retrieval DS processing unit to retrieve content based in part on the access rights is discussed in greater detail with reference to FIGS. 13-15.

Figure 13:
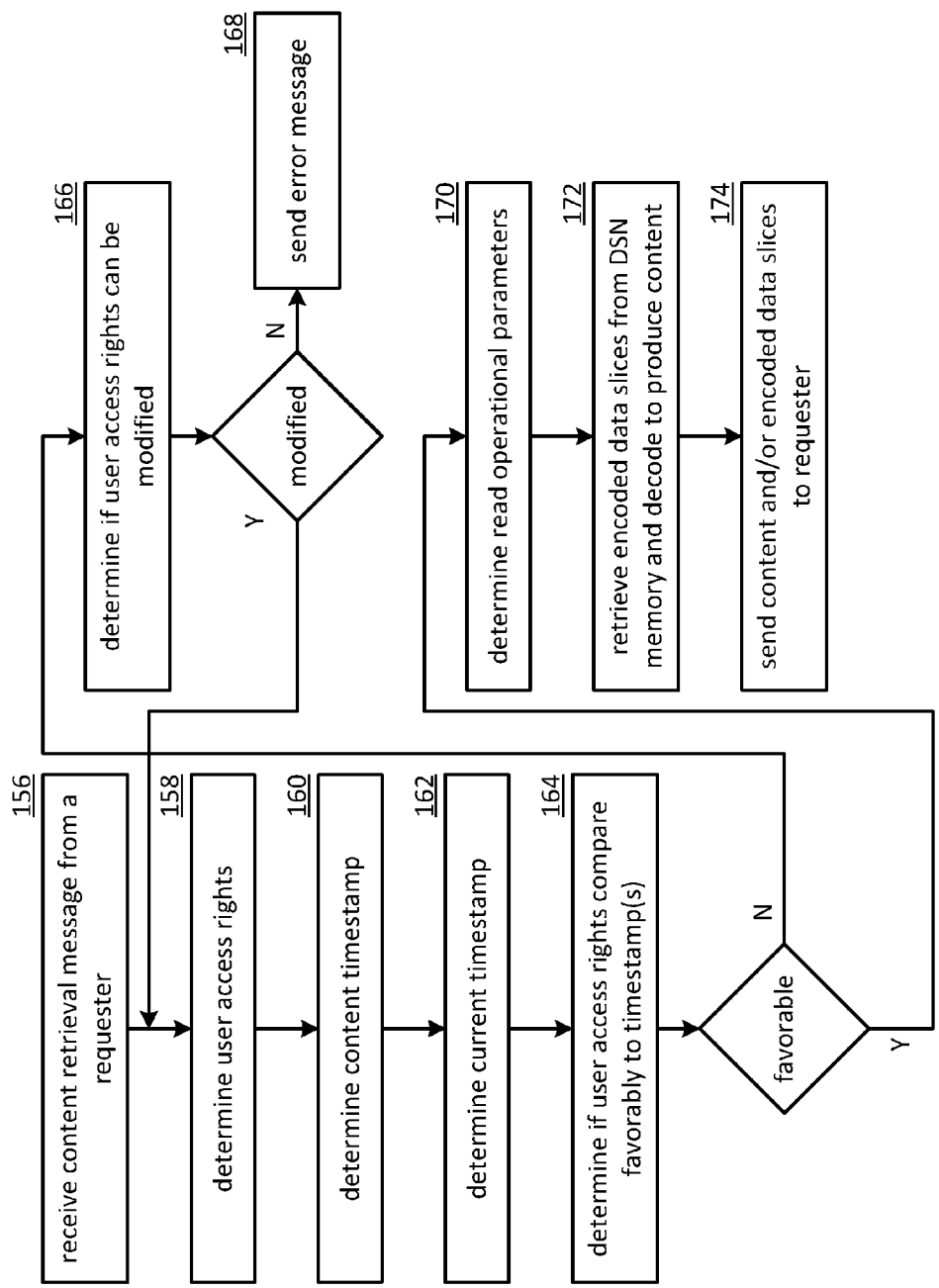
FIG. 13 is another flowchart illustrating another example of retrieving content in accordance with the invention.

FIG. 13 is another flowchart illustrating another example of retrieving content. The method begins with step 156 where a processing module (e.g., of a retrieval dispersed storage (DS) processing unit) receives a content retrieval message from a requester. The requester may include one or more of a set top box, a user device, a DS managing unit, a storage integrity processing unit, another DS processing unit, a DS unit, and another source. The retrieval message may include a content identifier (ID), a user ID, a content type indicator, digital rights management (DRM) information, a DRM policy, and read operational parameters.

The method continues at step 158 where the processing module determines user access rights based on one or more of the content ID, the user ID, a user access rights table lookup, a content type indicator, DRM information, DRM policy, user base information, system parameters, and read operational parameters. The method continues at step 160 where the processing module determines a content timestamp based on one or more of the content ID, the user ID, a content timestamp table lookup, a user access rights table lookup, a content type indicator, DRM information, DRM policy, user base information, system parameters, and read operational parameters. The method continues at step 162 where the processing module determines the current timestamp as discussed previously with reference to FIGS. 11-12.

The method continues at step 164 where the processing module determines if the user access rights compare favorably to the content timestamp and current timestamp. In an example, the processing module determines if the user had access rights at the time of content ingestion into a dispersed storage network (DSN) memory. In another example the processing module determines if the user currently has access rights to the content. The method of determining if the user access rights compare favorably to the timestamps is discussed in greater detail with reference to FIGS. 14-15. The method branches to step 170 when the processing module determines that the user access rights compare favorably to the timestamps. The method continues to step 166 when the processing module determines that the user access rights do not compare favorably to the timestamps.

The method continues at step 166 where the processing module determines if the user access rights can be modified. In an example, the processing module may query a DS managing unit to request a modification to the user access rights. Modification to the user access rights may include providing a capability to purchase the user access rights (e.g., retroactively) or a capability to pay a premium (e.g., subscription) for unlimited lifetime access to the content.

In another example, the processing module sends a message to the requester to determine if the user access rights can be modified (e.g., sell immediate access). The method to determine if the user access rights can be modified is discussed in greater detail with reference to FIG. 16. The method repeats back to step 158 when the processing module determines that the user access rights can be modified. The method ends at step 168 where the processing module sends an error message (e.g., to the requester and/or the DS managing unit) when the processing module determines that the user access rights cannot be modified.

The method continues at step 170 where the processing module determines read operational parameters when the processing module determines that the user access rights compare favorably to the timestamps. The read operational parameters may include one or more of the pillar width, read threshold, pillars allowed to retrieve from, a decode method, a de-slice method, a decryption method, a decryption key, and pillar combinations for this requester. Such a determination may be based on one or more of the content ID, the user ID, a user access rights table lookup, a content ingestion table lookup, a content type indicator, DRM information, DRM policy, user base information, system parameters, and a vault lookup. The method continues at step 172 where the processing module retrieves encoded data slices from the DSN memory and decodes the encoded data slices utilizing an error coding dispersed storage function and in accordance with the read operational parameters produce the content. The method continues at step 174 where the processing module sends the content and/or the encoded data slices to the requester.

FIG. 14 is a flowchart illustrating an example of determining user access rights. The method begins with step 176 where a processing module determines if each of a plurality of users has access to a requested content identifier (ID). Such a determination may be based on one or more of the content ID, a user ID, a user access rights table lookup, a content ingestion table lookup, a global content access list, a content type indicator, digital rights management (DRM) information, a DRM policy, user base information, system parameters, and a vault lookup. The method branches to step 182 when the processing module determines that each of the plurality of users have access to the content ID. The method continues to step 178 when the processing module determines that each of the plurality of users do not have access to the content ID. The method continues at step 178 where the processing module determines if a start timestamp is before a content timestamp based on a comparison of the two timestamps. The method branches to step 184 when the processing module determines that the start timestamp is not before the content timestamp. The method continues to step 180 when the processing module determines that the start timestamp is before the content timestamp.

The method continues at step 180 where the processing module determines if an end timestamp is after the content timestamp based on a comparison of the two timestamps. The method branches to step 182 when the processing module determines that the end timestamp is after the content timestamp. The method continues to step 184 when the processing module determines that the end timestamp is not after the content timestamp. The method continues at step 184 where the processing module indicates that the access rights do not compare favorably to the timestamps when the processing module determines that the end timestamp is not after the content timestamp or when the processing module determines that the start timestamp is not before the content timestamp. The method continues at step 182 where the processing module indicates that the access rights compare favorably to the timestamps when the processing module determines that the end timestamp is after the content timestamp or when each of the plurality of users have access to the content ID.

FIG. 15 is another flowchart illustrating another example of determining user access rights. The method begins with step 186 where a processing module determines if each of a plurality of users has access to a requested content ID. Such a determination may be based on one or more of the content ID, a user ID, a user access rights table lookup, a content ingestion table lookup, a global content access list, a content type indicator, digital rights management (DRM) information, a DRM policy, user base information, system parameters, and a vault lookup. The method branches to step 192 when the processing module determines that each of the plurality of users have access to the content ID. The method continues to step 188 when the processing module determines that all users do not have access to the content ID. The method continues at step 188 where the processing module determines if a start timestamp is before a current timestamp by comparing the two timestamps. The method branches to step 194 when the processing module determines that the start timestamp is not before the current timestamp. The method continues to step 190 when the processing module determines that the start timestamp is before the current timestamp.

The method continues at step 190 where the processing module determines if an end timestamp is before the current timestamp by comparing the two timestamps. The method branches to step 192 when the processing module determines that the end timestamp is not before the current timestamp. The method continues to step 194 when the processing module determines that the end timestamp is before the current timestamp. The method continues at step 194 where the processing module indicates that the access rights do not compare favorably to the timestamps when the processing module determines that the end timestamp is before the current timestamp or when the processing module determines that the start timestamp is not before the current timestamp. The method continues at step 192 where the processing module indicates that the access rights compare favorably to the timestamps when the processing module determines that the end timestamp is not before the current timestamp or when each of the plurality of users have access to the content ID.

Figure 16:
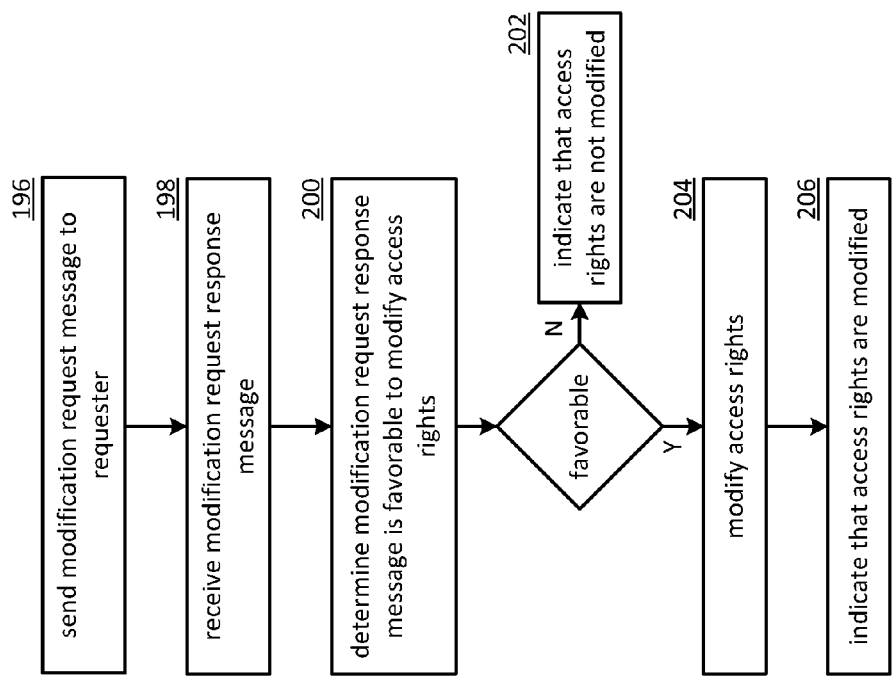
FIG. 16 is a flowchart illustrating an example of modifying user access rights in accordance with the invention.

FIG. 16 is a flowchart illustrating an example of modifying user access rights. The method begins with step 196 where a processing module sends a modification request message to a requester. Such a notification request message may include one or more of a content identifier (ID), a user ID, digital rights management (DRM) information, a DRM policy, content type, and modification information. The modification information may include modification requirements (e.g., insufficient access right when the content was ingested by a dispersed storage network (DSN) memory, insufficient current access rights) and/or pricing information for access rights modification.

The method continues at step 198 where the processing module receives a modification request response message from the requester where the message may include one or more of content ID, user ID, subscription information, payment information, DRM information, DRM policy, content type, and modification information. In an example, the processing module may receive the modification request response message that includes a payment of five dollars to enable a user to have immediate access to requested content.

The method continues at step 200 where the processing module determines if the modification request response message is favorable to modify access rights. Such a determination may be based on one or more of content ID, user ID, subscription information, payment information, a comparison of the payment information to the modification information, a comparison of subscription information to the required subscription, DRM information, DRM policy, content type, and modification information. In an example, the processing module determines that the response message is favorable when the payment information is sufficient to gain access rights. The method branches to step 204 when the processing module determines that the modification request response message is favorable to modify the access rights. The method continues to step 202 when the processing module determines that the modification request response message is not favorable to modify access rights. The method continues at step 202 where the processing module indicates that the access rights are not modified.

The method continues at step 204 where the processing module modifies the access rights when the processing module determines that the modification request response message is favorable to modify access rights. In an example, the processing module modifies the user access rights by changing an entry in a user access rights table such that a start timestamp and an end timestamp wrap around a content timestamp to enable content access when content access rights at the time of ingestion into the DSN memory are required. In another example, the processing module modifies the user access rights by changing an entry in the user access rights table such that the end timestamp is not before the current timestamp to enable content access when content access rights at the current timestamp are required. The method continues at step 206 where the processing module sends an indication message to indicate that the access rights are modified. In instance, the processing module sends the indication message to a dispersed storage (DS) managing unit.

Figure 17:
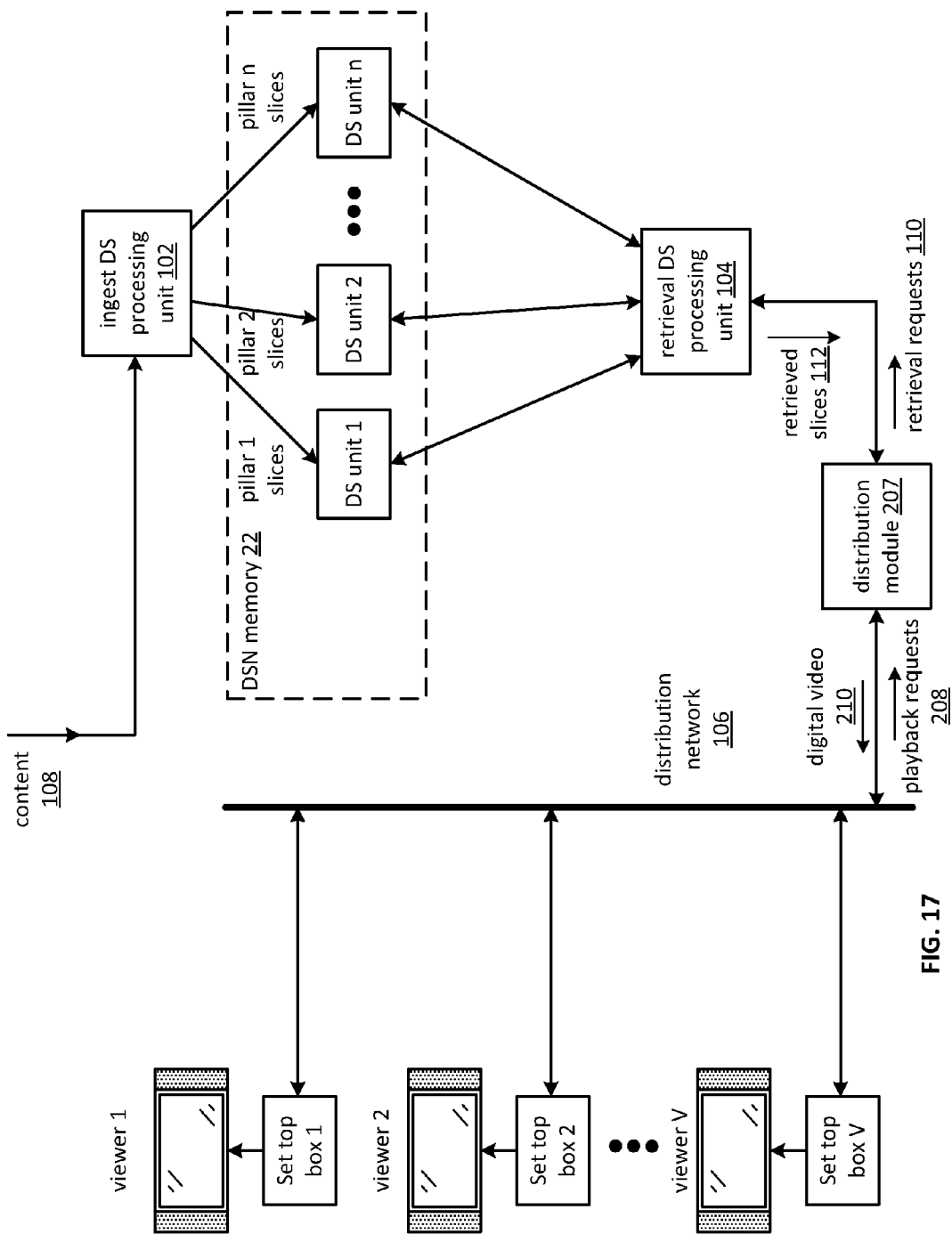
FIG. 17 is another schematic block diagram of another embodiment of a computing system in accordance with the invention.

FIG. 17 is another schematic block diagram of another embodiment of a computing system. As illustrated, the system includes at least one ingest dispersed storage (DS) processing unit 102, a dispersed storage network (DSN) memory 22, a retrieval DS processing unit 104, a distribution network 106, at least one distribution module 207, a plurality of set top boxes 1-V, and a plurality of viewers 1-V. The DSN memory 22 includes a plurality of DS units 1-n. The distribution network 106 may include one or more of a hybrid fiber coax system, a satellite system, an internet access system, and a wireless system. The set top boxes 1-V include the computing core 26 of FIG. 2 DS processing 34 to receive/retrieve content slices, de-slice, and decode to produce the content for consumption (e.g., viewing).

The viewers 1-V may be implemented with a flat panel television including a display and speakers to reproduce content. As illustrated, the ingest DS processing unit 102 and the retrieval DS processing unit 104 are implemented as at least two units. In another implementation example, the ingest DS processing unit 102 and the retrieval DS processing unit 104 are implemented in the same unit. In yet another implementation example, the ingest DS processing unit 102 and/or the retrieval DS processing unit 104 are implemented as part of at least one of the set top boxes 1-V. In yet another implementation example, the DSN memory 22 is implemented in one or more of the set top boxes 1-V. The distribution module 207 may be implemented utilizing the computer core 26 of FIG. 2 and may further be implemented as an independent unit as illustrated, as part of the retrieval DS processing unit 104, and/or in one or more of the set top boxes 1-V serving a plurality of set top boxes.

The ingest DS processing unit 102 stores at least a portion of content 108 in the DSN memory 22. The retrieval DS processing unit 104 retrieves at least a portion of the content 108 from the DSN memory 22 and sends the content 108 as retrieved slices 112 to the distribution module 207 in response to retrieval requests 110. The distribution module 207 decodes at least some of the retrieved slices 112 utilizing an error coding dispersal storage function to produce digital video 210. The distribution module 207 sends the digital video to 10 to one or more of the set top boxes 1-V for consumption by one or more of the viewers 1-V via the distribution network 106. The viewers 1-V reproduce content (e.g., video, audio, pictures, web content) output from the corresponding set top boxes 1-V. The set top boxes 1-V may select live broadcast content (e.g., broadcast/multicast or on-demand video over cable, satellite and/or the internet) and/or stored content from the DSN memory 22 via the distribution module 207 and/or the retrieval DS processing unit 104.

The set top boxes 1-V sends commands to the distribution module 207. The commands include one or more of playback request 208, a record request, a pause request, a skip forward request, a skip backwards request, a select broadcast content request, and a delete request. In an example of operation, the ingest DS processing unit 102 stores a portion of the content 108 in the DSN memory 22 in response to a record command from set top box 6 (e.g., transferred from the distribution module 207). Set top box 6 sends a playback request 208 to the distribution module 207 to playback the portion of the content 108. The distribution module 207 sends a retrieval request 110 to the retrieval DS processing unit 104. Next, the retrieval DS processing unit 104 retrieves the portion of the content as retrieved slices 112 from the DSN memory 22 and sends the retrieved slices 112 to the destination module 207. The distribution module 207 decodes the retrieved slices 112 to produce digital video 210 and sends the digital video 210 to the set top box 6. The set top box 6 receives the digital video 210 and formats the video to produce formatted video in a format substantially compatible with viewer 6. The set top box 6 sends the formatted video to viewer 6.

In another example of operation, the ingest DS processing unit 102 determines which portion of the content 108 to store in the DSN memory 22 for subsequent retrieval (e.g., immediately, minutes, hours, days, and even years later) and consumption by one or more of the set top boxes 1-V. Such a determination may be based on one or more of a command, a command from the set top box, a command from the distribution module 207, a command from the retrieval DS processing unit 104, a command from a DS managing unit, a DSN memory status indictor, and a predetermination. In an example, set top box 7 sends a record request to the distribution module 207.

The distribution module 207 sends a record command to the ingest DS processing unit 102 identifying which portion of the content 108 to store in the DSN memory 22. In another example, the ingest DS processing 102 determines to store all of the received content 108 based on a predetermination. For instance, the ingest DS processing unit 102 continuously stores all content 108 from a 500 channel cable TV distribution system. The set top boxes 1-V may retrieve slices and/or content immediately and/or at a time much later than the original reception of the content by the ingest DS processing unit 102. For instance, the set top boxes 1-V retrieve content from the DSN memory 22, via the distribution module 207 and the retrieval DS processing unit 104, immediately after the content 108 was stored in the DSN memory 22 to mimic broadcast reception. In another instance, the set top boxes 1-V may retrieve content from the DSN memory 22 hours, days, months, or even years after the content of 108 was stored in the DSN memory 22 to mimic digital video recorder playback.

In another example of operation, the ingest DS processing unit 102 determines to store content selected by one or more of the plurality of set top boxes 1-V. For instance, set top box 2 sends a record command to the distribution module 207 where the record command includes a command to record the 5:30 pm evening news on cable channel 188 on October 18. The distribution module 207 sends a record command to the retrieval DS processing unit 104. The retrieval DS processing unit 104 communicates the record command to the ingest DS processing unit 102. The ingest DS processing unit 102 processes the record command which may include saving the store command for future execution.

The ingest DS processing unit 102 executes the store command on October 18 at 5:30 pm by selecting the content from cable channel 188, receiving the content, determining write operational parameters (e.g., pillar width n, write threshold, encoding method, slicing method, encryption method, etc.), encoding the content utilizing and error coded dispersed storage function and in accordance with write operational parameters to produce a plurality of sets of encoded data slices, determining which DS units to store the plurality of sets of encoded data slices, and sending the plurality of sets of encoded data slices to the DSN memory 22 with a store command for storage in the selected DS units. Note that the ingest DS processing unit 102 determines the write operational parameters based on one or more of a command, a command from the retrieval DS processing unit, an estimated number of store commands received for the same content indicator, a system performance indicator, a memory utilization indicator, a policy indicator, a total population of set top boxes indicator, and a predetermination.

Note that multiple set top boxes may send the distribution module 207 a record command specifying the same content portion. In an example, the ingest DS processing unit 102 stores slices created from a content portion in response to receiving at least one record command for the content portion from at least one set top box (e.g., via the distribution module 207 and the retrieval DS processing unit 104). The ingest DS processing unit 102 determines if it has received record commands for the same content portion (e.g., check a table of pending record operations) and processes the record commands in accordance with the determination. In another example, the ingest DS processing unit 102 queues the store command based on receiving a first record command for the content portion and queues nothing when receiving a second record command for the same content portion as the first record command. In this instance, the first record command for a given content portion invokes storing the content as slices to the DSN memory 22 and any other subsequent record commands for the same content do not change the storing of that content portion as slices in the DSN memory 22.

In another example of operation, the ingest DS processing unit 102 queues the store command based on receiving a first record command for the content portion and queues another store command when receiving a second (or subsequent) record command for the same content portion as the first record command. For instance, the ingest DS processing unit 102 determines different write operational parameters based on receiving two or more store commands for the same content portion. Such a determination may be based on one or more of a command, a command from the retrieval DS processing unit, the number of store commands received for the same content portion, a system performance indicator, a memory utilization indicator, a policy indicator, a total population of set top boxes indicator, and a predetermination.

Note that the ingest DS processing unit 102 may receive a record/store command after the content (e.g., a live broadcast stream) has been started to be received but before it has all been received (e.g., part way in a real time broadcast). The ingest DS processing unit 102 may determine the same or different write operational parameters for a content recording in progress when an incremental record command for that content is received.

The ingest DS processing unit 102 processes the record command (e.g., from the viewer/set top box via the distribution module 207 and/or the retrieval DS processing unit 104) including determining read operational parameters for the viewer for a content portion (e.g., pillar width n, which particular pillars are allowed to read, read threshold, decoding method, de-slicing method, decryption method, etc.). In an example, the ingest DS processing unit 102 performs the determination when the ingest DS processing unit 102 receives the record command.

In another example, the distribution module 207 determines the read operational parameters when the retrieval distribution module 207 receives a playback request 208 from a viewer/set top box. In either example, the determination may be based on one or more of a command, the number of store commands received for the same content portion, an estimated number of store commands received for the same content portion indicator, which combinations of pillars have already been assigned (e.g., the read operational parameters of other viewers), a system performance indicator, a cost indicator, a subscription level indicator, a reliability requirement, a reliability estimator, a memory utilization indicator, a pillar availability indicator, a policy indicator, a total population of set top boxes indicator, and a predetermination. For instance, set top box 1 is assigned read operational parameters to read from pillars 1-10 and set top box 2 is assigned read operational parameters to read from pillars 3-12 when the system has 16 pillars and a read threshold of 10 and both set top boxes have requested the same content portion. In another instance, each set top box is assigned more than one set of combinations of allowed read pillars to improve read reliability. For example, the distribution module 207 may utilize one or more of the allowed read pillar sets of the read operational parameters (e.g., for the particular set top box) to convert retrieved slices 112 from the allowed read pillars into the desired content portion as digital video 210.

Figure 18:
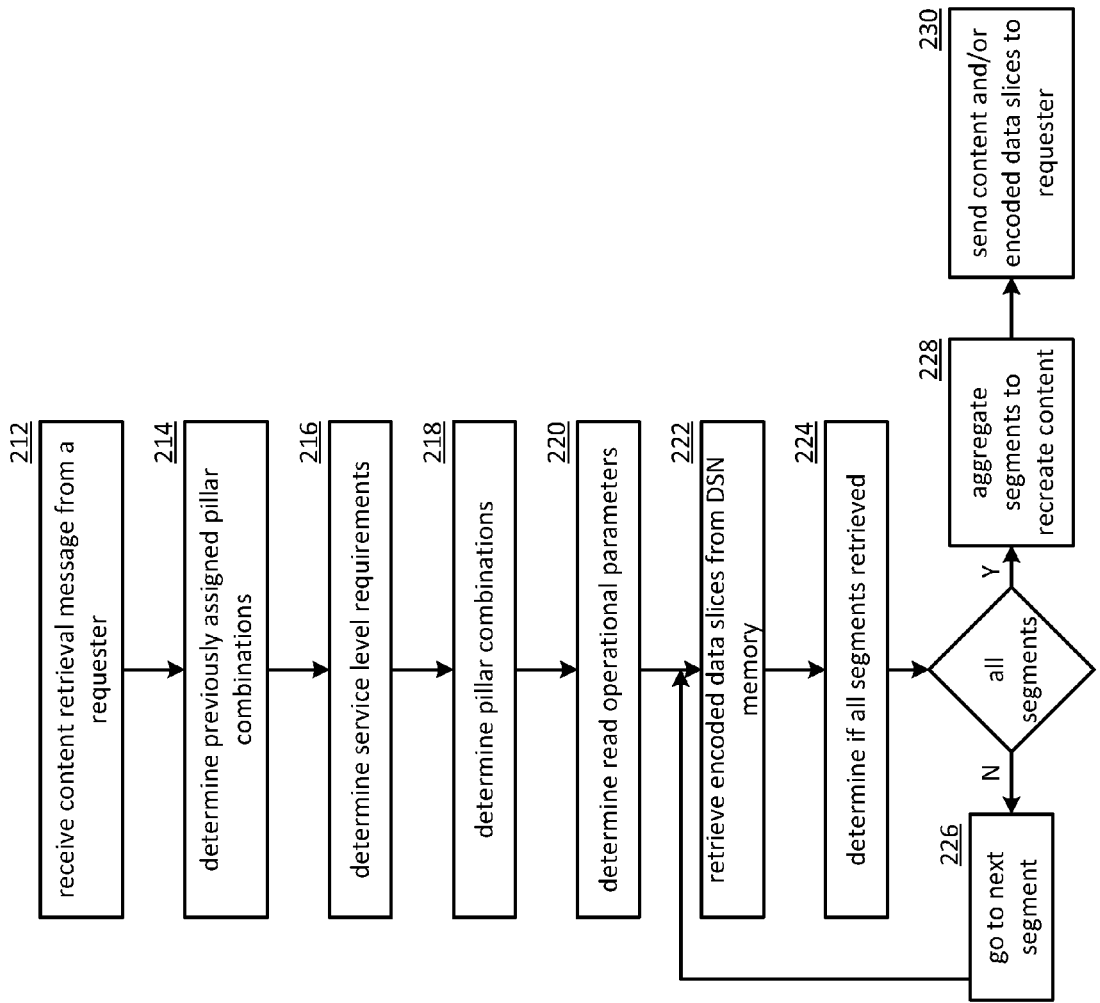
FIG. 18 is another flowchart illustrating another example of retrieving content in accordance with the invention.

FIG. 18 is another flowchart illustrating another example of retrieving content. The method begins with step 212 were a processing module (e.g., of a retrieval dispersed storage (DS) processing unit) receives a content retrieval message from a requester. The requester may include a set top box, a user device, a storage integrity processing unit, a DS managing unit, another DS processing unit, and/or a DS unit. The content retrieval message may include one or more of a content identifier (ID), a user ID, digital rights management (DRM) information, a DRM policy, read operational parameters, and a content type indicator.

The method continues at step 214 where the processing module determines previously assigned pillar combinations where the pillar combinations include sets of DS unit pillars that may be utilized to retrieve previously stored slices of the requested content. Such a determination may be based on one or more of the content ID, the user ID, a vault lookup, a pillar combination table lookup, DRM information, a DRM policy, read operational parameters, system parameters, and a content type indicator.

The method continues at step 216 where the processing module determines service-level requirements, which may include cost requirements, availability requirements, reliability requirements, performance requirements, and/or combinations of requirements. In an example, a user may require highly reliable retrievals where the cost is not important. In another example the user may require the lowest cost possible and is willing to sacrifice reliability. Such a determination may be based on one or more of the content of the content retrieval message, content ID, the user ID, a vault lookup, a pillar combination table lookup, DRM information, a DRM policy, read operational parameters, system parameters, and a content type indicator.

The method continues at step 218 where the processing module determines pillar combinations, which may include one or more unique sets of combination of pillars to retrieve slices from. Such a determination may be based on one or more of the user ID, a vault lookup, a pillar combination table lookup, previously assigned pillars, write operational parameters utilized when the content was stored in the DS and memory, the content of the content retrieval message, content ID, DRM information, a DRM policy, read operational parameters, system parameters, and a content type indicator. In an example, the retrieval processing module science the read pillar combinations for a first time to the requester. In another example the processing module is recalling the read pillar combinations for the second or greater time for the same requester.

Note that there are many possible ways to allocate pillar combinations. For example, when the pillar width is 32 and the read threshold is 24 there are over 10 million ways to choose 24 pillars out of 32 pillars. For instance, 10,000 users may be assigned an average of 1000 pillar combination each to provide a certain level of retrieval reliability. In some cases a user may be assigned just five pillar combinations while in another case a user may be assigned 5000 pillar combinations based on one or more of service-level requirements, pillar combination availability, and service tiers and pricing levels.

The method continues at step 220 where the processing module determines the read operational parameters which may include one or more of a pillar width, read threshold, write threshold, pillars allowed to retrieve from, a decode method, a de-sliced method, a decryption method, and a decryption key. Note that the pillar combinations may be unique and specific to the requester if access to the content is restricted. Such a determination may be based on one or more of a user ID, a vault lookup, a pillar combination table lookup, previously assigned pillars, write operational parameters utilized when the content was stored in the DSN memory, the content of the content retrieval message, content ID, DRM information, a DRM policy, the read operational parameters, system parameters, and a content type indicator.

The method continues at step 222 where the processing module retrieves a plurality of encoded data slices from the DSN memory in accordance with the read operational parameters, the allowed pillar combinations, and/or the DRM policy. In an example, the processing module decodes a set of encoded data slices of the plurality of encoded data slices using an error coding dispersed storage function and the read operational parameters to produce a data segment. The processing module continues to decode more sets to produce more segments. The processing module temporarily saves each of the data segments until they are all retrieved. In another example, the retrieval processing module temporarily saves each of the retrieved encoded data slices (e.g., at least a read threshold) for each of the data segments as they are retrieved until slices from all of the data segments are retrieved.

The method continues at step 224 where the processing module determines if all of the data segments have been retrieved based on one or more of the read operational parameters, a content size indicator, and data segments reproduced so far. The method branches to step 228 when the processing module determines that all segments have been retrieved. The mythic continues to step 226 the processing module determines that all segments have not been retrieved. The method continues at step 226 where the processing module selects the next segment and the method repeats back to step 222. Note that the processing module utilizes the same read operational parameters and pillar combinations for each data segment. The method continues at step 228 where the processing module aggregates the data segments to recreate a content portion. The method continues at step 230 where the processing module sends the content portion and/or the encoded data slices of each data segment to the requester.

Figure 19:
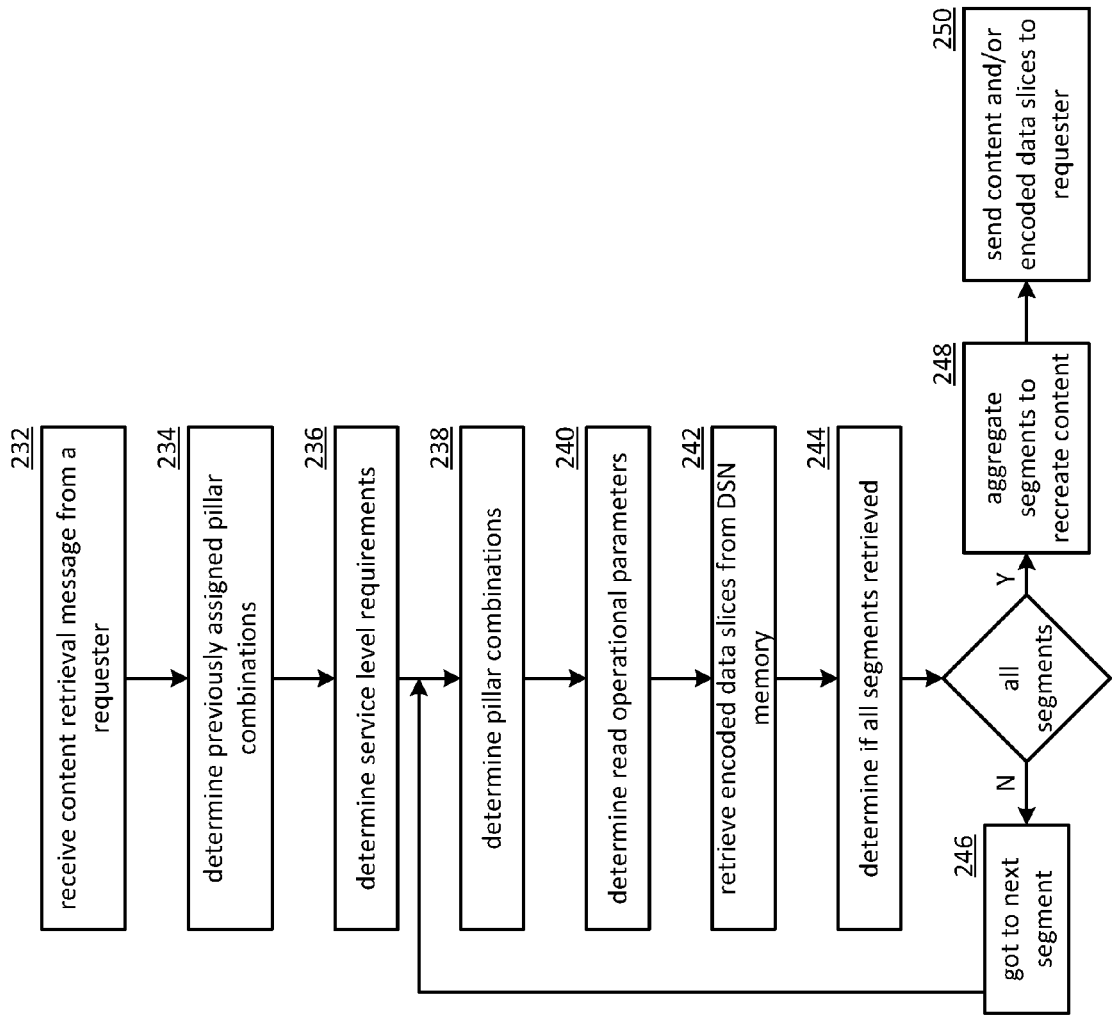
FIG. 19 is another flowchart illustrating another example of retrieving content in accordance with the invention.

FIG. 19 is another flowchart illustrating another example of retrieving content. The method begins with step 232 where a processing module (e.g., of a retrieval dispersed storage (DS) processing unit) receives a content retrieval message from a requester. The requester may include a set top box, a user device, a storage integrity processing unit, a DS managing unit, another DS processing unit, and/or a DS unit. The content retrieval message may include one or more of a content identifier (ID), a user ID, digital rights management (DRM) information, a DRM policy, read operational parameters, and a content type indicator.

The method continues at step 234 where the processing module determines previously assigned pillar combinations where the pillar combinations include sets of DS unit pillars that may be utilized to retrieve previously stored slices of the requested content. Such a determination may be based on one or more of the content ID, a user ID, a vault lookup, a pillar combination table lookup, DRM information, a DRM policy, read operational parameters, system parameters, and a content type indicator.

The method continues at step 236, processing module determines service-level requirements, which may include cost requirements, availability requirements, reliability requirements, performance requirements, and/or combinations of requirements. In an example, a user may require highly reliable retrievals where the cost is not important. In another example the user may require the lowest cost possible and is willing to sacrifice reliability. Such a determination may be based on one or more of content of the content retrieval message, a content ID, a user ID, a vault lookup, a pillar combination table lookup, DRM information, a DRM policy, read operational parameters, system parameters, and a content type indicator.

The method continues at step 238 where the processing module determines pillar combinations for data segment of the requested content, which may include one or more unique sets of combination of pillars to retrieve slices from. Such a determination may be based on one or more of a user ID, a vault lookup, a pillar combination table lookup, previously assigned pillars, previously utilized pillar combination by this user ID, a list of data segments and pillar combinations, a data segment ID, write operational parameters utilized when the content was stored in a dispersed storage network (DSN) memory, content of the content retrieval message, content ID, DRM information, a DRM policy, read operational parameters, system parameters, and a content type indicator. In an example, the processing module assigns the read pillar combinations for a first time to the requester. In another example, the processing module is recalling the read pillar combinations for a second or greater time for the same requester.

Note that there are many possible ways to allocate pillar combinations. For example, when the pillar width is 32 and the read threshold is 24 there are over 10 million ways to choose 24 pillars out of 32 pillars. For instance, 10,000 users may be assigned an average of 1000 pillar combination each to provide a certain level of retrieval reliability. In some cases a user may be assigned just five pillar combinations while in another case a user may be assigned 5000 pillar combinations based on one or more of service-level requirements, pillar combination availability, and/or service tiers and pricing levels. In an embodiment, each data segment utilizes a different set of pillar combinations to further improve the security if restricted access content.

The method continues at step 240 where the processing module determines read operational parameters which may include a pillar width, read threshold, write threshold, pillars allowed to retrieve from, the decode method, the de-sliced method, decryption method, and/or the decryption key. Note that the pillar combinations may be unique and specific to the requester if access to the content is restricted. Such a determination may be based on one or more of a user ID, a vault lookup, a pillar combination table lookup, previously assigned pillars, write operational parameters utilized when the content was stored in the DS and memory, the content of the content retrieval message, content ID, DRM information, a DRM policy, the read operational parameters, system parameters, and a content type indicator.

The method continues at step 242 where the processing module retrieves a plurality of sets of encoded data slices corresponding to each data segment from the DSN memory in accordance with the read operational parameters, the allowed pillar combinations for the current data segment, and/or the DRM policy. In an example, the processing module decodes a set of the plurality of sets of encoded data slices using and error coding dispersal storage function and in accordance with the read operational parameters to produce a data segment. The processing module decodes more segments from more sets of the plurality of encoded data slices and temporarily saves each of the reproduced data segments until they are all retrieved. In another example, the processing module temporarily saves each of the retrieved encoded data slices (e.g., at least a read threshold) corresponding to each of the data segments as they are retrieved until encoded data slices from all of the data segments are retrieved.

The method continues at step 244 where the processing module determines if all of the data segments have been retrieved based on one or more of the read operational parameters, a content size indicator, and/or data segments retrieved so far. The method branches to step 248 when the processing module determines that all of the data segments have been retrieved. The method continues to step 246 when the processing module determines that all of the data segments have not been retrieved. The method continues at step 246 where the processing module goes to the next data segment and the method repeats back to step 238. Note that the processing module may utilize different read operational parameters and different pillar combinations for each data segment. The method continues at step 248 where the processing module aggregates the data segments to recreate a content portion. The method continues at step 250 where the processing module sends the content portion and/or the encoded data slices of each data segment to the requester.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more processing modules of a dispersed storage network (DSN), the method comprises:

receiving, from a requester, a request for retrieval of content previously stored within a DSN memory, wherein the request includes at least the identity of sets of encoded data slices representing the content;

determining user time-frame access rights based on comparison of one or more timestamps associated with the user to a timestamp of the requested content;

determining user content access rights based on a comparison of the identity of the sets of encoded data slices and user subscribed content access information;

when the user time-frame and content access rights compare favorably:

determining read operation parameters regarding the sets of encoded data slices;

retrieving a threshold number of encoded data slices for each of the sets of encoded data slices from the DSN memory in accordance with the read operation parameters; and decoding the sets of the threshold number of encoded data slices utilizing an error coding dispersed storage function of the read operation parameters to produce the content; and sending the content to the requester; and when one or more of the user access time-frame access rights and the user content access rights compare unfavorably:

determining whether the one or more of the user access time-frame access rights and the user content access rights are modifiable to provide a favorable comparison; and when the one or more of the user access time-frame access rights and the user content access rights are modifiable, modifying the one or more of the user access time-frame access rights and the user content access rights to provide a favorable comparison.

2. The method of claim 1, wherein the requester includes one or more of:

a set top box; a user device; a dispersed storage (DS) managing unit; a storage integrity processing unit; another DS processing unit; a DS unit; and another source.

3. The method of claim 1 further comprises the request including one or more of:

a user ID; a content type indicator; digital rights management (DRM) information; a DRM policy; and read operational parameters.

4. The method of claim 3, wherein the determining of user content access rights is based on one or more of:

the user ID; a user access rights table lookup; a content timestamp table lookup; a content type indicator; the DRM information; the DRM policy; user information; system parameters; a vault lookup; and read operational parameters.

5. The method of claim 1 further comprises determining if the user had access rights at the time of storage of the content into the DSN memory and, if so, providing a favorable user access rights comparison.

6. The method of claim 1 further comprises determining if the user has access rights to the content at the time of the request and, if so, providing a favorable user access rights comparison.

7. The method of claim 1, wherein the read operational parameters include one or more of:
   pillar width; read threshold; pillars allowed to retrieve from; a decode method; a de-slice method; a decryption method; a decryption key; and pillar combinations for the requester.

8. The method of claim 1, wherein the modifying the one or more of the user access time-frame access rights and the user content access rights comprises;
   providing any of the following to the requester:
      an error message;
      capability to purchase the one or more of the user access time-frame access rights and the user content access rights; and
      capability to pay a premium for unlimited lifetime access to the content.

9. The method of claim 1 further comprises, prior to receiving the request, an ingest dispersed storage (DS) processing unit receiving the content, determining the identity of sets of encoded data slices representing the content, determining a current timestamp and storing in a content ingestion table a content ID in a content ID field and further storing the current timestamp as the content timestamp in a content timestamp field.

10. The method of claim 9 further comprises a retrieval DS processing unit utilizing information from the content ingestion table to determine when the content was ingested into the DSN memory.

11. The method of claim 9, wherein the current timestamp determination is based on one or more of:
   a system clock; an ingest dispersed storage (DS) processing unit clock; a command; a message; and a query.

12. A dispersed storage (DS) module comprises:
   a first DS processing module, when operable within a computing device, causes the computing device to:
      receive, from a requester, a request for retrieval of a set of encoded content data slices from a dispersed storage network (DSN) memory, wherein the request includes at least the identity of the set of encoded content data slices;
      determine user time-frame access rights based on a content timestamp;
      determine user content access rights based on a comparison of the identity of the sets of encoded data slices and user subscribed content access information;
      when the user time-frame and content access rights compare favorably:
      determine read operation parameters regarding the sets of encoded data slices;
      retrieve a threshold number of encoded data slices for each of the sets of encoded data slices from the DSN memory in accordance with the read operation parameters; and
      decode the sets of the threshold number of encoded data slices utilizing an error coding dispersed storage function of the read operational parameters produce the content;
      send the content and/or the encoded data slices to the requester; and
      when one or more of the user access time-frame access rights and the user content access rights compare unfavorably:
         determine whether the one or more of the user access time-frame access rights and the user content access rights are modifiable to provide a favorable comparison; and
         when the one or more of the user access time-frame access rights and the user content access rights are modifiable, modify the one or more of the user access time-frame access rights and the user content access rights to provide a favorable comparison.

13. The dispersed storage (DS) module of claim 12 further comprises the first processing module modifying the one or more of the user access time-frame access rights and the user content access rights by:
   providing any of the following to the requester:
      an error message;
      capability to purchase the one or more of the user access time-frame access rights and the user content access rights; and
      capability to pay a premium for unlimited lifetime access to the content.

* * * * *